US008428160B2

(12) United States Patent
Tao et al.

(10) Patent No.: US 8,428,160 B2
(45) Date of Patent: Apr. 23, 2013

(54) MULTI-CARRIER DIGITAL MOBILE MULTIMEDIA BROADCAST SYSTEM AND THE DIGITAL INFORMATION TRANSMISSION METHOD THEREOF

(75) Inventors: Tao Tao, Beijing (CN); Dong Bai, Beijing (CN); Qihong Ge, Beijing (CN); Huishi Song, Beijing (CN); Wen Chen, Beijing (CN); Yibin Liang, Beijing (CN); Qinghua Yang, Beijing (CN); Lian Wang, Beijing (CN); Qun Li, Beijing (CN); Hongbing Shen, Beijing (CN)

(73) Assignee: TIMI Technologies Co., Ltd., Beijing (CN)

( * ) Notice: Subject to any disclaimer, the term of this patent is extended or adjusted under 35 U.S.C. 154(b) by 449 days.

(21) Appl. No.: 12/446,054

(22) PCT Filed: Nov. 15, 2006

(86) PCT No.: PCT/CN2006/003070
§ 371 (c)(1),
(2), (4) Date: Nov. 8, 2010

(87) PCT Pub. No.: WO2008/049282
PCT Pub. Date: May 2, 2008

(65) Prior Publication Data
US 2011/0051825 A1 Mar. 3, 2011

(30) Foreign Application Priority Data
Oct. 20, 2006 (CN) .......................... 2006 1 0113915

(51) Int. Cl.
*H01K 1/10* (2006.01)
(52) U.S. Cl.
USPC ........................................................ 375/260

(58) Field of Classification Search ................... 375/260
See application file for complete search history.

(56) References Cited

U.S. PATENT DOCUMENTS

2006/0077887 A1* 4/2006 Roh et al. ...................... 370/208
2006/0171283 A1* 8/2006 Vijayan et al. ................... 369/94

FOREIGN PATENT DOCUMENTS

| CN | 1244752 | 2/2000 |
|----|---------|--------|
| CN | 1487741 | 4/2004 |
| CN | 1516460 | 7/2004 |
| CN | 1571512 | 1/2005 |
| EP | 0 980 157 | 2/2000 |
| WO | WO 2005/086446 | 9/2005 |

* cited by examiner

Primary Examiner — Kevin Kim
(74) Attorney, Agent, or Firm — Morgan, Lewis & Bockius LLP

(57) ABSTRACT

The present invention discloses a multi-carrier digital multimedia broadcast system and the digital information transmission method thereof. After RS encoding and byte interleaving, LDPC encoding, bit interleaving and constellation mapping to an upper layer of data streams in turn, the obtained data symbol is multiplexed with scattered pilots and continual pilots which include the system information to form an OFDM frequency domain symbol and scrambled; an OFDM time domain symbol is generated by IFFT transforming, and after inserted with the frame head to build a time slot, it is connected to form a signal frame of the physical layer; the signal frame of the physical layer is transmitted after being low-pass filtered and orthogonal upconverted. The system and method thereof provide wireless broadcast with high quality such as audio, video and multimedia data and the like for mobile, fixed and portable receivers, and can use the satellite transmission and terrestrial transmission method for transmitting. The method utilizes the LDPC OFDM scheme, and the system applies the microwave and large scale integrated circuit technologies while fulfills the needs for low cast and high performance.

47 Claims, 8 Drawing Sheets

$$\xrightarrow{\Lambda\ x_2 x_1 x_0} \begin{pmatrix} x_0 & x_1 & x_2 & \Lambda & x_{359} \\ x_{360} & x_{361} & x_{362} & \Lambda & x_{719} \\ x_{720} & x_{721} & x_{722} & \Lambda & x_{1079} \\ M & M & M & O & M \\ x_{383*360} & x_{383*360+1} & x_{383*360+2} & \Lambda & x_{383*360+359} \end{pmatrix} \xrightarrow{\Lambda\ x_{720} x_{360} x_0}$$
Fig. 10
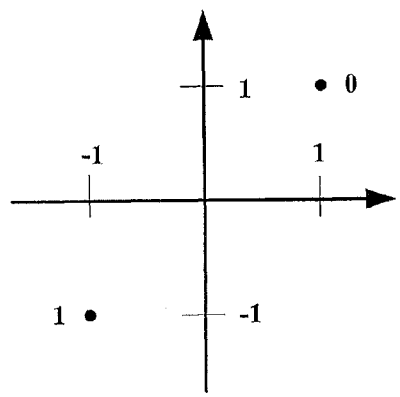
Fig. 11
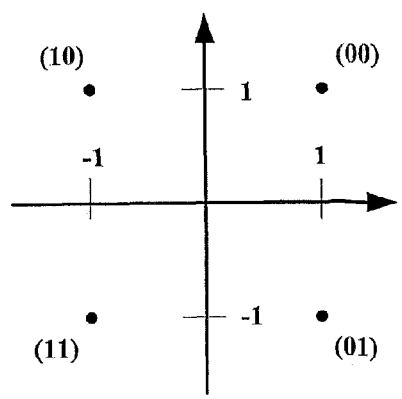
Fig. 12

MULTI-CARRIER DIGITAL MOBILE MULTIMEDIA BROADCAST SYSTEM AND THE DIGITAL INFORMATION TRANSMISSION METHOD THEREOF

TECHNICAL FIELD

The present invention relates to digital information transmission field, and more particularly, to a digital multimedia broadcast system and an information transmission method thereof.

BACKGROUND

Besides large coverage and large program capacity, wireless communication broadcasting has a most excellent characteristic of its broadcast capability which can be point-to-point and point-to-face, and it has high transmission bandwidth with low cost. Thus, as an important component of information communication industry, the wireless communication broadcasting plays an important role in the construction of national information infrastructure and realization of normal service and national information security strategy.

With years of research and development, the digital wireless broadcast has obtained many achievements which reaches practical use stage. Presently, there are 4 wireless digital television broadcast standards in the world:

1) Digital Video Broadcasting (DVB) Standards Series.

DVB is proposed by European Telecommunications Standards Institute (ETSI). After the Europe stopped development of Digital-to-Analog mixed television system in 1993, it began to undertake research on digital television broadcast system, and successively issued Digital Video Broadcasting-Satellite (DVB-S), Digital Video Broadcasting-Cable (DVB-C), Digital Video Broadcasting-Terrestrial (DVB-T) standards and Digital Video Broadcasting-Handheld (DVB-H) standard based on DVB-T.

The DVB-S standard in the above mentioned standards utilizes single carrier QPSK modulation, uses cascaded convolution code and RS code as channel encoding, scrambles with Pseudo-Random Bit Sequence (PRBS), uses wireless satellite links, which is only adaptable to fixed receiving system rather than mobile terminal devices. The DVB-T standard uses multi-carrier Orthogonal Frequency Division Multiplexing (OFDM) modulation technology and encoding technology of cascaded convolution code and RS code, which is adapted to open-ground transmission, however, the moving speed is low. Although the DVB-H system optimizes for mobilization and handheld purpose, the optimization is not sufficient due to the limitation of DVB-T coding and modulation technology.

2) American ATSC Standard

The American ATSC standard is a single-carrier digital television terrestrial transmission standard proposed by Advanced Television System committee (ATSC), which can support fixed receiving of digital television with standard definition and high-definition. However, the performance thereof is inferior under mobile reception condition and can not support satellite transmission.

3) Japanese ISDB-T Standard

ISDB-T is an Integrated Service Digital Broadcasting-Terrestrial standard revised by Japan digital broadcasting expert group which achieves terrestrial broadcasting of various digital services with OFDM technology, convolution code and RS code. However, the performance thereof is inferior under mobile reception condition and can not support satellite transmission.

4) Japan-Korean Digital Satellite Broadcasting Standard

In May, 1998, Toshiba Corp., SKTelecomm Corp., Sharp Corp., Toyota Motor Corp. etc. jointly invested and founded a Mobile Broadcasting Corporation. And it launched a broadcasting satellite in March, 2004, and now it is running into business, providing services for Japan and Korea. The system also uses PRBS, interleaving concatenated encoding, and it transmits in a manner of CDM frequency spreading. Although the Japan-Korean digital satellite broadcasting standard can support mobile reception, the performance thereof is not sound enough, which needs further improvement.

SUMMARY OF INVENTION

To overcome the shortcomings of the four kinds of transmission modes aforementioned, the present invention optimizes design and proposes an integrated wireless multi-service broadcast system architecture adapted for satellite transmission, terrestrial transmission etc., which can provide for mobile, portable and fixed receiving users with high-quality audio, video and multimedia data services.

The present invention provides a multi-carrier digital mobile multimedia broadcast system comprising a transmitter and portable, fixed or mobile receivers, the transmitter comprising:

a RS encoding and byte interleaving module for RS encoding and byte interleaving an upper layer data stream;

a LDPC encoder for LDPC encoding the data outputted from the byte interleaver to obtain bit data;

a bit interleaver for bit interleaving of the bit data outputted from the LDPC encoder;

a constellation mapping module, in which the data outputted from the bit interleaver is constellation mapped;

a frequency-domain symbol generator for multiplexing together discrete pilots, continuous pilots containing system information and data symbols being constellation mapped to form an OFDM frequency-domain symbol;

a scrambler for scrambling the OFDM frequency-domain symbol;

an OFDM modulator for performing IFFT transformation to the frequency-domain symbol outputted from the scrambler to generate an OFDM time-domain symbol;

a time-domain framing device for concatenating the time slots which are formed with the OFDM time-domain symbols to form a physical layer signal frame.

The system uses wireless channels such as satellite or terrestrial wireless channels etc. mainly for achieving mobile reception. The system supports single frequency network and multi-frequency network modes, and it can select corresponding transmission modes and parameters based on the transmitted data types and networking environments for transmitting video streams such as H.264, AVS, MPEG-2, MPEG-4 etc, and audio streams such as AC-3, AAC etc., and it supports mixed transmission modes with kinds of data types for transmitting broadcasting data including audio data, text and video data.

The present invention also provides a digital information transmission method for a multi-carrier digital mobile multimedia broadcast system, comprising the following steps:

RS encoding and byte interleaving an upper layer data stream with a RS encoding and byte interleaveing module, in which the row numbers of the byte interleaver is determined by a byte interleaving mode and a LDPC code rate;

LDPC encoding the byte interleaved data by a LDPC encoder to obtain bit data;

bit interleaving the LDPC encoded bit data by a bit interleaver;

constellation mapping the byte interleaved data by a constellation mapping module;

multiplexing discrete pilots, continuous pilots containing system information and data symbols being constellation mapped by a frequency-domain symbol generator to form an OFDM frequency-domain symbol;

scrambling the multiplexed OFDM frequency-domain symbol with a scrambler;

performing IFFT transformation to the scrambled frequency-domain symbol to generate an OFDM time-domain symbol by an IFFT transformer;

concatenating the time slots which are formed by inserting a frame head to the time-domain OFDM symbol with a time-domain framing device to form a physical signal frame;

transmitting the physical signal frame after low-pass filtering and orthogonal up-converting.

The digital information transmission method transmits multimedia broadcasting data including audio data, text and video data.

The system adopts an OFDM scheme of LDPC, and the receiver of the system uses the most advanced technologies of microwave and large scale digital integrated circuit which satisfies requirements of low cost and high performance.

BRIEF DESCRIPTION OF DRAWINGS

The present invention is described but not limited in conjunction with the embodiments shown in the drawings throughout which the similar reference signs represent the similar elements, in which:

FIG. 10 is a schematic view of bit interleaving to the bit stream being LDPC encoded;

FIGS. 11, 12 and 13 are BPSK constellation mapping view, QPSK constellation mapping view and 16 QAM constellation mapping view respectively;

DETAILED DESCRIPTION OF PREFERRED EMBODIMENTS

The present invention can provide multimedia programs including high quality digital audio broadcasting and digital video broadcasting.

The present invention defines functional modules of the physical layer which can perform adaptive processing to the broadcasting upper layer data stream of the mobile multimedia broadcast system within 8 MHz bandwidth, and it discloses frame structure, channel encoding and modulation technologies of the transmission signals in the physical layer of the mobile multimedia broadcast channel.

The physical layer is an under layer of OSI which is fundamental to the whole open system. The physical layer provides transmission media and interconnecting devices for data communication between devices and provides reliable environments for data transmission.

The physical layer of broadcast channel defined in the present invention meets different transmission rates for various applications of the upper layers by the physical logical channels. The physical logical channels support various encoding and modulating manners to satisfy different requirements of different applications, different transmission environments to signal quality.

The physical layer of the broadcast channel defined in the present invention supports two kinds of networking modes, i.e., a single frequency network and a multi-frequency network. And different transmission modes and parameters can be selected based on actually application characteristics and networking environments. And mixed mode of various applications is provided to match the application characteristics with the transmission mode, thus achieving flexibility and economy of applications.

The preferred embodiment of the invention will be described in detail with reference to accompanying figures.

Figure 1:
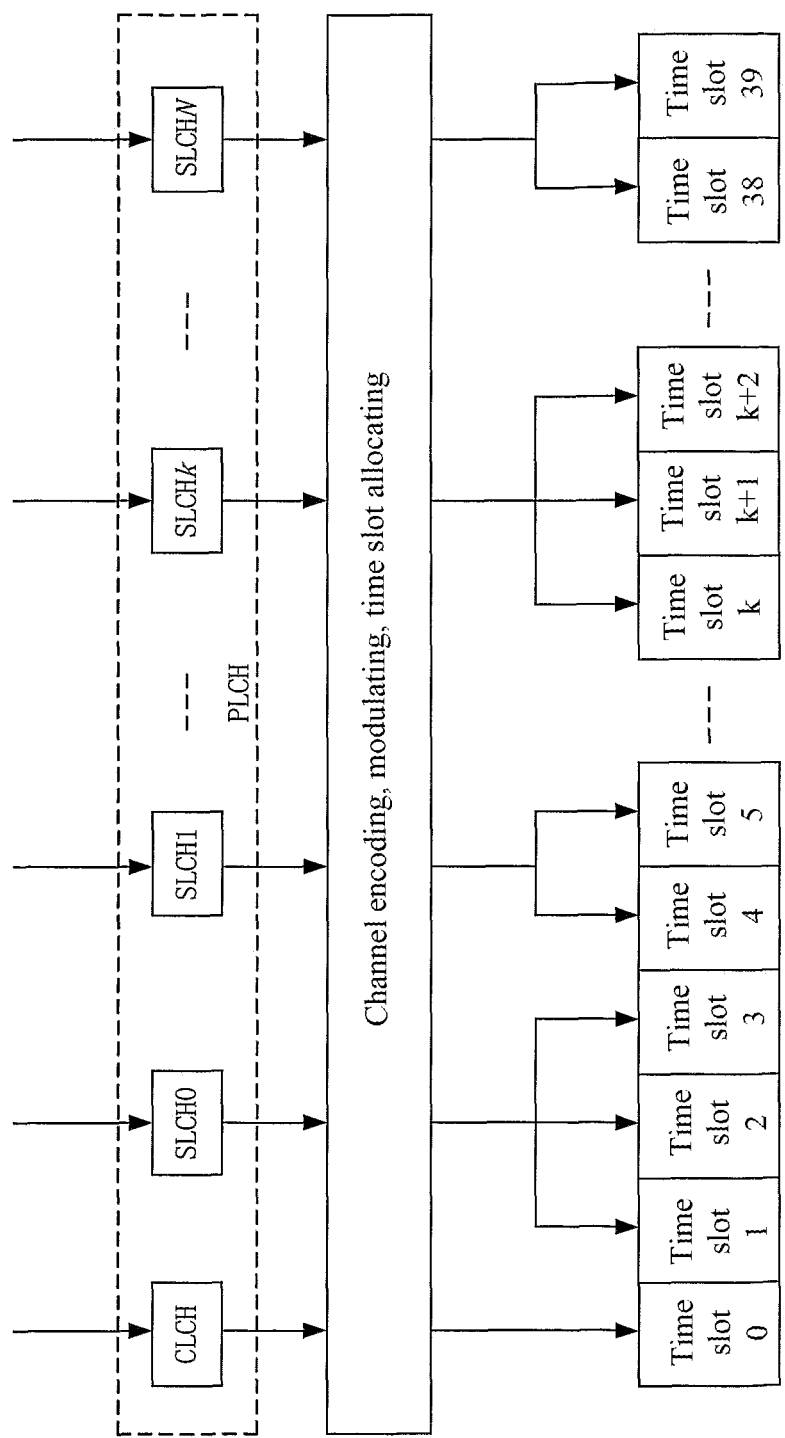
FIG. 1 is a structural view of a physical logical channel of a broadcasting channel in a mobile multimedia broadcast system according to some embodiments of the invention.

FIG. 1 is a structural view of a physical logical channel of a broadcasting channel in a mobile multimedia broadcast system according to some embodiments of the invention.

As shown in the Figure, the physical layer provides a broadcast channel for upper layer application by a physical logical channel, i.e., PLCH, which includes a control logic channel (CLCH) and a service logic channel (SLCH). Each physical logical channel can use one or more of time slots in the 8 MHz digital television bandwidth for transmission. The physical layer performs separate encoding and modulation for each physical logical channel. The physical logical channel can provide different transmission capacity with different encoding and modulating parameters.

Figure 2:
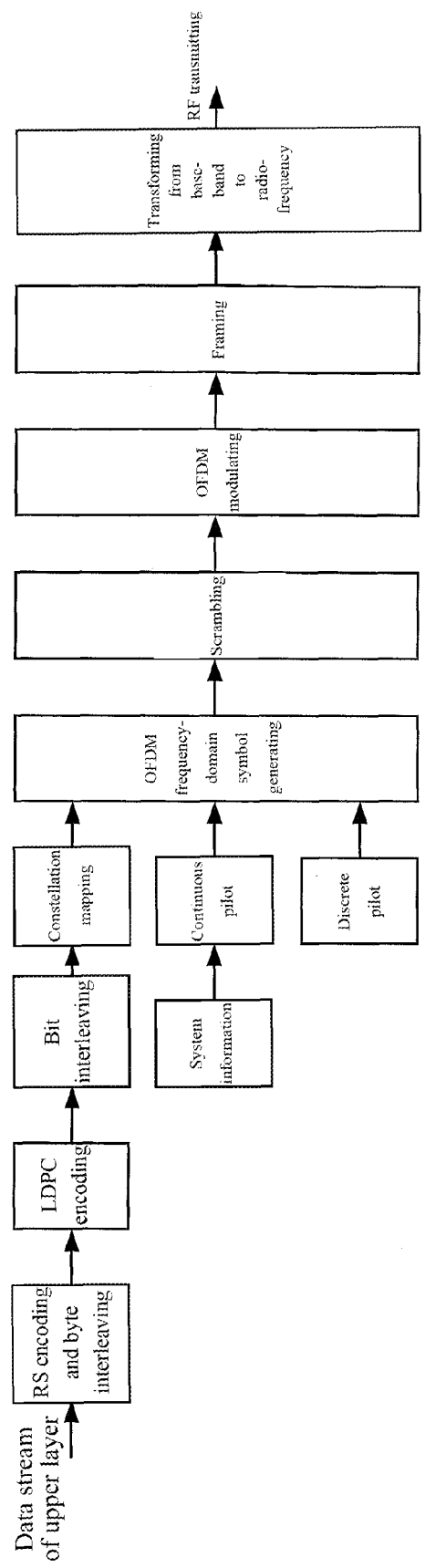
FIG. 2 is a flow chart of logical channel encoding and modulation of the physical layer in the mobile multimedia broadcast system according to some embodiments of the invention.

FIG. 2 is a flow chart of logical channel encoding and modulation of the physical layer in the mobile multimedia broadcast system according to some embodiments of the invention.

As shown in the figure, the inputted, data stream of the physical logical channel undertakes OFDM modulation by multiplexing together with discrete pilot and continuous pilot after forward correction encoding, interleaving and constellation mapping. The modulated signal forms a physical signal frame after being inserted with a frame head. And the signal is transmitted after being transformed from baseband to RF (radio-frequency).

The physical logical channel is divided into the control logical channel (CLCH) and the service logical channel (SLCH). The control logical channel carries system configuration information, and uses a fixed channel encoding and modulation model to transmit at the 0th time slot of the system, in which: RS encoding uses RS(240, 240), the LDPC encoding uses LDPC encoding with ½ code rate, the constellation mapping uses BPSK mapping, the scramble mode adopts mode 0. The service logical channel can use one or more time slots except the $0^{th}$ time slot for transition, and the encoding and modulation mode thereof are configured by the upper layers, the configuration information is broadcasted through the control logical channel.

The sub-modules in FIG. 2 will be described in detail in the following.

Figure 3:
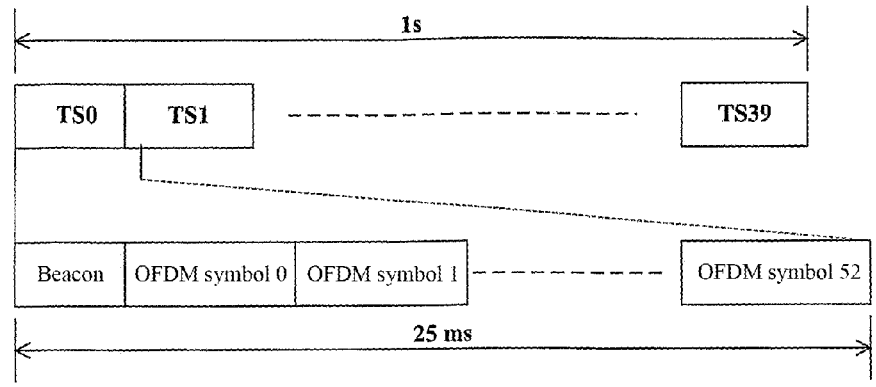
FIG. 3 is a time slot division and frame structure view of the physical signal frame formed by time-slot framing in FIG. 2.

FIG. 3 is a time slot division and frame structure view of the physical signal frame formed by time-slot framing in FIG. 2.

As shown in the figure, each second represents 1 frame in the signal of the physical layer of the system, and each frame is divided into 40 time slots (TS), with each time slot having a length of 25 ms.

Each time slot comprises a beacon and 53 OFDM modulating data blocks.

Figure 4:
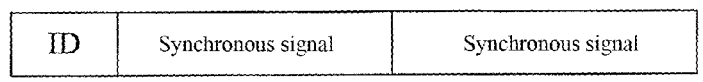
FIG. 4 is a structural view of a beacon in FIG. 3.

FIG. 4 is a structural view of a beacon in FIG. 3.

As shown in the figure, the beacon has two same synchronous signals and a transmitter identification signal (ID).

Figure 5:
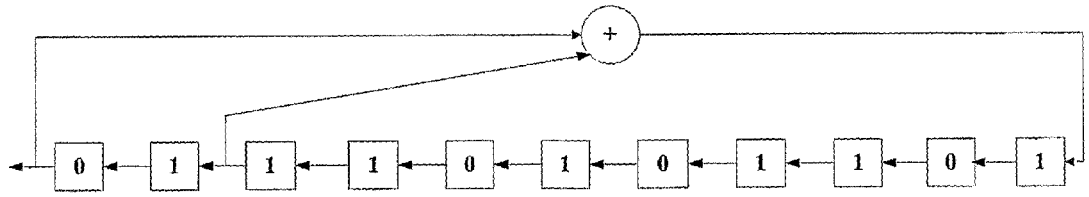
FIG. 5 is a schematic structural view of a pseudo-random sequence generator of a synchronous signal.

The synchronous signal is a pseudo-random sequence with a limited frequency band, having a length of 204.8 us. The synchronous signal is generated as follows: firstly, the pseudo-random sequence is generated by a pseudo-random sequence generator for synchronous signal as shown in FIG. 5, as shown in the figure, the polynomial for generating the pseudo-random sequence is $x11+x9+1$, with preset value of 01110101101; then the former 1538 points are extracted from the m-sequence with 2047 points, after BPSK mapping ($0 \rightarrow 1+0j$, $1 \rightarrow -1+0j$), they are put into the 1th~769th and 1279th~2047th points within the 2048-point (0~2047) sequence; and a synchronous signal is obtained after the generated 2048-point of sequence being subjected to IFFT.

The transmitter identification signal (ID) transmits a pseudo-random sequence with limited frequency-band having a length of 36 us for identifying different transmitter. The generating method of the transmitter identification signal is as follows:

Selecting a transmitter identification sequence; after BPSK mapping ($0 \rightarrow 1+0j$, $1 \rightarrow -1+0j$) of the 191-point transmitter identification sequence, they are putted into the 1th~95th and 160th~255th points in the 256-point (0~255) sequence; after the 256 point being subjected to IFFT and extending the period to 360 points, thus obtaining the transmitter identification signal.

The transmitter identification sequence is a pseudo-random sequence with a length of 191 bits. The transmitter identification sequence includes 256 sequences in total in which the $0^{th} \sim 127^{th}$ sequence designates district identification for identifying location of the transmitter, and it is inserted and transmitted by the even time-slots in the signal frame (the $0^{th}$ time slot, the second time slot, . . . ); the $128^{th} \sim 255^{th}$ sequence designates the identification of a transmitter for identifying different transmitters in a same district, which is inserted and transmitted by the odd time-slots in the signal frame (the first time-slot, the third time-slot, . . . ). The transmitter identification sequence is defined by a hex sequence which is mapped to a binary transmitter identification sequence in an order that the highest effective bit first to enter into the BPSK mapping step. The transmitter identification sequences are shown as in Table 1.

TABLE 1

| | transmitter identification sequence |
|---|---|
| No. | transmitter identification sequence |
| 0 | 13D4D8C54024C3946F0885F7E90647459AADBAF65C14B581 |
| 1 | 46818D90157196C13A5DD0A2BC531210CFF8EFA30941E0D4 |
| 2 | 20E7EBF67317F0A75C3BB6C4DA357476A99E89C56F2786B2 |
| 3 | 75B2BEA32642A5F2096EE3918F602123FCCBDC903A72D3E7 |
| 4 | 1CDBD7CA4F2BCC9B60078AF8E609484A95A2B5F9531BBA8E |
| 5 | 498E829F1A7E99CE3552DFADB35C1D1FC0F7E0AC064EEFDB |
| 6 | 2FE8E4F97C18FFA85334B9CBD53A7B79A69186CA602889BD |
| 7 | 7ABDB1AC294DAAFD0661EC9E806F2E2CF3C4D39F357DDCE8 |
| 8 | 132BD83A40DBC36B6FF78508E9F947BA9A52BA095CEBB57E |
| 9 | 467E8D6F158E963E3AA2D05DBCAC12EFCF07EF5C09BEE02B |
| 10 | 2018EB0973E8F0585CC4B63BDACA7489A961893A6FD8864D |
| 11 | 754DBE5C26BDA50D0991E36E8F9F21DCFC34DC6F3A8DD318 |
| 12 | 1C24D7354FD4CC6460F88A07E6F648B5955DB50653E4BA71 |
| 13 | 497182601A81993135ADDF52B3A31DE0C008E05306B1EF24 |
| 14 | 2F17E4067CE7FF5753CBB934D5C57B86A66E863560D78942 |
| 15 | 7A42B15329B2AA02069EEC6180902ED3F33BD3603582DC17 |
| 16 | 13D4273A40243C6B6F087A08E906B8BA9AAD45095C144A7E |
| 17 | 4681726F1571693E3A5D2F5DBC53EDEFCFF8105C09411F2B |
| 18 | 20E7140973170F585C3B493BDA358B89A99E763A6F27794D |
| 19 | 75B2415C26425A0D096E1C6E8F60DEDCFCCB236F3A722C18 |
| 20 | 1CDB28354F2B336460077507E609B7B595A24A06531B4571 |
| 21 | 498E7D601A7E663135522052B35CE2E0C0F71F53064E1024 |
| 22 | 2FE81B067C18005753344634D53A8486A691793560287642 |
| 23 | 7ABD4E53294D550206611361806FD1D3F3C42C60357D2317 |
| 24 | 132B27C540DB3C946FF77AF7E9F9B8459A5245F65CEB4A81 |
| 25 | 467E7290158E69C13AA22FA2BCACED10CF0710A309BE1FD4 |
| 26 | 201814F673E80FA75CC449C4DACA8B76A96176C56FD879B2 |
| 27 | 754D41A326BD5AF209911C918F9FDE23FC3423903A8D2CE7 |
| 28 | 1C2428CA4FD4339B60F875F8E6F6B74A955D4AF953E4458E |
| 29 | 49717D9F1A8166CE35AD20ADB3A3E21FC0081FAC06B110DB |
| 30 | 2F171BF97CE700A853CB46CBD5C58479A66E79CA60D776BD |
| 31 | 7A424EAC29B255FD069E139E8090D12CF33B2C9F358223E8 |
| 32 | 13D4D8C5BFDB3C6B6F0885F716F9B88BA9AADBAF6A3EB4A7E |
| 33 | 46818D90EA8E693E3A5DD0A243ACEDEFCFF8EFA3F6BE1F2B |
| 34 | 20E7EBF68CE80F585C3BB6C425CA8B89A99E89C590D8794D |
| 35 | 75B2BEA3D9BD5A0D096EE391709FDEDCFCCBDC90C58D2C18 |
| 36 | 1CDBD7CAB0D4336460078AF819F6B7B595A2B5F9ACE44571 |
| 37 | 498E829FE58166313552DFAD4CA3E2E0C0F7E0ACF9B11024 |
| 38 | 2FE8E4F983E700575334B9CB2AC58486A69186CA9FD77642 |
| 39 | 7ABDB1ACD6B255020661EC9E7F90D1D3F3C4D39FCA822317 |

TABLE 1-continued

| No. | transmitter identification sequence |
|---|---|
| 40 | 132BD83ABF243C946FF785081606B8459A52BA09A3144A81 |
| 41 | 467E8D6FEA7169C13AA2D05D4353ED10CF07EF5CF6411FD4 |
| 42 | 2018EB098C170FA75CC4B63B25358B76A961893A902779B2 |
| 43 | 754DBE5CD9425AF20991E36E7060DE23FC34DC6FC5722CE7 |
| 44 | 1C24D735B02B339B60F88A071909B74A955DB506AC1B458E |
| 45 | 49718260E57E66CE35ADDF524C5CE21FC008E053F94E10DB |
| 46 | 2F17E406831800A853CBB9342A3A8479A66E86359F2876BD |
| 47 | 7A42B153D64D55FD069EEC617F6FD12CF33BD360CA7D23E8 |
| 48 | 13D4273ABFDBC3946F087A0816F947459AAD4509A3EBB581 |
| 49 | 4681726FEA8E96C13A5D2F5D43AC1210CFF8105CF6BEE0D4 |
| 50 | 20E714098CE8F0A75C3B493B25CA7476A99E763A90D886B2 |
| 51 | 75B2415CD9BDA5F2096E1C6E709F2123FCCB236FC58DD3E7 |
| 52 | 1CDB2835B0D4CC9B6007750719F6484A95A24A06ACE4BA8E |
| 53 | 498E7D60E58199CE355220524CA31D1FC0F71F53F9B1EFDB |
| 54 | 2FE81B0683E7FFA8533446342AC57B79A69179359FD789BD |
| 55 | 7ABD4E53D6B2AAFD066113617F902E2CF3C42C60CA82DCE8 |
| 56 | 132B27C5BF24C36B6FF77AF7160647BA9A5245F6A314B57E |
| 57 | 467E7290EA71963E3AA22FA2435312EFCF0710A3F641E02B |
| 58 | 201814F68C17F0585CC449C425357489A96176C59027864D |
| 59 | 754D41A3D942A50D09911C91706021DCFC342390C572D318 |
| 60 | 1C2428CAB02BCC6460F875F8190948B5955D4AF9AC1BBA71 |
| 61 | 49717D9FE57E993135AD20AD4C5C1DE0C0081FACF94EEF24 |
| 62 | 2F171BF98318FF5753CB46CB2A3A7B86A66E79CA9F288942 |
| 63 | 7A424EACD64DAA02069E139E7F6F2ED3F33B2C9FCA7DDC17 |
| 64 | 6C2B273ABFDB3C6B6F0885F7E9064745655245509A3EB4A7E |
| 65 | 397E726FEA8E693E3A5DD0A2BC5312103007105CF6BE1F2B |
| 66 | 5F1814098CE80F585C3BB6C4DA3574765661763A90D8794D |
| 67 | 0A4D415CD9BD5A0D096EE3918F6021230334236FC58D2C18 |
| 68 | 63242835B0D4336460078AF8E609484A6A5D4A06ACE44571 |
| 69 | 36717D60E58166313552DFADB35C1D1F3F081F53F9B11024 |
| 70 | 50171B0683E700575334B9CBD53A7B79596E79359FD77642 |
| 71 | 05424E53D6B255020661EC9E806F2E2C0C3B2C60CA822317 |
| 72 | 6CD427C5BF243C946FF78508E9F947BA65AD45F6A3144A81 |
| 73 | 39817290EA7169C13AA2D05DBCAC12EF30F810A3F6411FD4 |
| 74 | 5FE714F68C170FA75CC4B63BDACA7489569E76C5902779B2 |
| 75 | 0AB241A3D9425AF20991E36E8F9F21DC03CB2390C5722CE7 |
| 76 | 63DB28CAB02B339B60F88A07E6F648B56AA24AF9AC1B458E |
| 77 | 368E7D9FE57E66CE35ADDF52B3A31DE03FF71FACF94E10DB |
| 78 | 50E81BF9831800A853CBB934D5C57B86599179CA9F2876BD |
| 79 | 05BD4EACD64D55FD069EEC6180902ED30CC42C9FCA7D23E8 |
| 80 | 6C2BD8C5BFDBC3946F087A08E906B8BA6552BAF6A3EBB581 |
| 81 | 397E8D90EA8E96C13A5D2F5DBC53EDEF3007EFA3F6BEE0D4 |
| 82 | 5F18EBF68CE8F0A75C3B493BDA358B89566189C590D886B2 |
| 83 | 0A4DBEA3D9BDA5F2096E1C6E8F60DEDC0334DC90C58DD3E7 |
| 84 | 6324D7CAB0D4CC9B60077507E609B7B56A5DB5F9ACE4BA8E |
| 85 | 3671829FE58199CE355220B35CE2E03F08E0ACF9B1EFDB |
| 86 | 5017E4F983E7FFA853344634D53A8486596E86CA9FD789BD |
| 87 | 0542B1ACD6B2AAFD06611361806FD1D30C3BD39FCA82DCE8 |
| 88 | 6CD4D83ABF24C36B6FF77AF7E9F9B84565ADBA09A314B57E |
| 89 | 39818D6FEA71963E3AA22FA2BCACED1030F8EF5CF641E02B |
| 90 | 5FE7EB098C17F0585CC449C4DACA8B76569E893A9027864D |
| 91 | 0AB2BE5CD942A50D09911C918F9FDE2303CBDC6FC572D318 |
| 92 | 63DBD735B02BCC6460F875F8E6F6B74A6AA2B506AC1BBA71 |
| 93 | 368E8260E57E993135AD20ADB3A3E21F3FF7E053F94EEF24 |
| 94 | 50E8E4068318FF5753CB46CBD5C58479599186359F288942 |
| 95 | 05BDB153D64DAA02069E139E8090D12C0CC4D360CA7DDC17 |
| 96 | 6C2B273A4024C3946F0885F716F9B8BA655245095C14B581 |
| 97 | 397E726F157196C13A5DD0A243ACEDEF3007105C0941E0D4 |
| 98 | 5F1814097317F0A75C3BB6C425CA8B895661763A6F2786B2 |
| 99 | 0A4D415C2642A5F2096EE391709FDEDC0334236F3A72D3E7 |
| 100 | 632428354F2BCC9B60078AF819F6B7B56A5D4A06531BBA8E |
| 101 | 36717D601A7E99CE3552DFAD4CA3E2E03F081F53064EEFDB |
| 102 | 50171B067C18FFA85334B9CB2AC58486596E79356028899BD |
| 103 | 05424E53294DAAFD0661EC9E7F90D1D30C3B2C60357DDCE8 |
| 104 | 6CD427C540DBC36B6FF785081606B84565AD45F65CEBB57E |
| 105 | 39817290158E963E3AA2D05D4353ED1030F810A309BEE02B |
| 106 | 5FE714F673E8F0585CC4B63B25358B76569E76C56FD8864D |
| 107 | 0AB241A326BDA50D0991E36E7060DE2303CB23903A8DD318 |
| 108 | 63DB28CA4FD4CC6460F88A071909B74A6AA24AF953E4BA71 |
| 109 | 368E7D9F1A81993135ADDF524C5CE21F3FF71FAC06B1EF24 |
| 110 | 50E81BF97CE7FF5753CBB9342A3A8479599179CA60D78942 |
| 111 | 05BD4EAC29B2AA02069EEC617F6FD12C0CC42C9F3582DC17 |
| 112 | 6C2BD8C540243C6B6F087A0816F947456552BAF65C144A7E |
| 113 | 397E8D901571693E3A5D2F5D43AC12103007EFA309411F2B |
| 114 | 5F18EBF673170F585C3B493B25CA7476566189C56F27794D |
| 115 | 0A4DBEA326425A0D096E1C6E709F21230334DC903A722C18 |

TABLE 1-continued transmitter identification sequence

| No. | transmitter identification sequence |
|---|---|
| 116 | 6324D7CA4F2B33646007750719F6484A6A5DB5F9531B4571 |
| 117 | 3671829F1A7E6631355220524CA31D1F3F08E0AC064E1024 |
| 118 | 5017E4F97C180057533446342AC57B79596E86CA60287642 |
| 119 | 0542B1AC294D5502066113617F902E2C0C3BD39F357D2317 |
| 120 | 6CD4D83A40DB3C946FF77AF7160647BA65ADBA095CEB4A81 |
| 121 | 39818D6F158E69C13AA22FA2435312EF30F8EF5C09BE1FD4 |
| 122 | 5FE7EB0973E80FA75CC449C425357489569E893A6FD879B2 |
| 123 | 0AB2BE5C26BD5AF209911C91706021DC03CBDC6F3A8D2CE7 |
| 124 | 63DBD7354FD4339B60F875F8190948B56AA2B50653E4458E |
| 125 | 368E82601A8166CE35AD20AD4C5C1DE03FF7E05306B110DB |
| 126 | 50E8E4067CE700A853CB46CB2A3A7B865991863560D776BD |
| 127 | 05BDB15329B255FD069E139E7F6F2ED30CC4D360358223E8 |
| 128 | 13D4D8C54024C39490F77A0816F9B8BA65524509A3EB4A7E |
| 129 | 46818D90157196C1C5A22F5D43ACEDEF3007105CF6BE1F2B |
| 130 | 20E7EBF67317F0A7A3C4493B25CA8B895661763A90D8794D |
| 131 | 75B2BEA32642A5F2F6911C6E709FDEDC0334236FC58D2C18 |
| 132 | 1CDBD7CA4F2BCC9B9FF8750719F6B7B56A5D4A06ACE44571 |
| 133 | 498E829F1A7E99CECAAD20524CA3E2E03F081F53F9B11024 |
| 134 | 2FE8E4F97C18FFA8ACCB46342AC58486596E79359FD77642 |
| 135 | 7ABDB1AC294DAAFDF99E13617F90D1D30C3B2C60CA822317 |
| 136 | 132BD83A40DBC36B90087AF71606B84565AD45F6A3144A81 |
| 137 | 467E8D6F158E963EC55D2FA24353ED1030F810A3F6411FD4 |
| 138 | 2018EB0973E8F058A33B49C425358B76569E76C5902779B2 |
| 139 | 754DBE5C26BDA50DF66E1C917060DE2303CB2390C5722CE7 |
| 140 | 1C24D7354FD4CC649F0775F81909B74A6AA24AF9AC1B458E |
| 141 | 497182601A819931CA5220AD4C5CE21F3FF71FACF94E10DB |
| 142 | 2F17E4067CE7FF57AC3446CB2A3A8479599179CA9F2876BD |
| 143 | 7A42B15329B2AA02F961139E7F6FD12C0CC42C9FCA7D23E8 |
| 144 | 13D4273A40243C6B90F785F716F947456552BAF6A3EBB581 |
| 145 | 4681726F1571693EC5A2D0A243AC12103007EFA3F6BEE0D4 |
| 146 | 20E7140973170F58A3C4B6C425CA7476566189C590D886B2 |
| 147 | 75B2415C26425A0DF691E391709F21230334DC90C58DD3E7 |
| 148 | 1CDB28354F2B33649FF88AF819F6484A6A5DB5F9ACE4BA8E |
| 149 | 498E7D601A7E6631CAADDFAD4CA31D1F3F08E0ACF9B1EFDB |
| 150 | 2FE81B067C180057ACCBB9CB2AC57B79596E86CA9FD789BD |
| 151 | 7ABD4E53294D5502F99EEC9E7F902E2C0C3BD39FCA82DCE8 |
| 152 | 132B27C540DB3C9490088508160647BA65ADBA09A314B57E |
| 153 | 467E7290158E69C1C55DD05D435312EF30F8EF5CF641E02B |
| 154 | 201814F673E80FA7A33BB63B25357489569E893A9027864D |
| 155 | 754D41A326BD5AF2F66EE36E706021DC03CBDC6FC572D318 |
| 156 | 1C2428CA4FD4339B9F078A07190948B56AA2B506AC1BBA71 |
| 157 | 49717D9F1A8166CECA52DF524C5C1DE03FF7E053F94EEF24 |
| 158 | 2F171BF97CE700A8AC34B9342A3A7B86599186359F288942 |
| 159 | 7A424EAC29B255FDF961EC617F6F2ED30CC4D360CA7DDC17 |
| 160 | 13D4D8C5BFDB3C6B90F77A08E9064745655245095C14B581 |
| 161 | 46818D90EA8E693EC5A22F5DBC5312103007105C0941E0D4 |
| 162 | 20E7EBF68CE80F58A3C4493BDA3574765661763A6F2786B2 |
| 163 | 75B2BEA3D9BD5A0DF6911C6E8F6021230334236F3A72D3E7 |
| 164 | 1CDBD7CAB0D433649FF87507E609484A6A5D4A06531BBA8E |
| 165 | 498E829FE5816631CAAD2052B35C1D1F3F081F53064EEFDB |
| 166 | 2FE8E4F983E70057ACCB4634D53A7B79596E7935602889BD |
| 167 | 7ABDB1ACD6B25502F99E1361806F2E2C0C3B2C60357DDCE8 |
| 168 | 132BD83ABF243C9490087AF7E9F947BA65AD45F65CEBB57E |
| 169 | 467E8D6FEA7169C1C55D2FA2BCAC12EF30F810A309BEE02B |
| 170 | 2018EB098C170FA7A33B49C4DACA7489569E76C56FD8864D |
| 171 | 754DBE5CD9425AF2F66E1C918F9F21DC03CB23903A8DD318 |
| 172 | 1C24D735B02B339B9F0775F8E6F648B56AA24AF953E4BA71 |
| 173 | 49718260E57E66CECA5220ADB3A31DE03FF71FAC06B1EF24 |
| 174 | 2F17E406831800A8AC3446CBD5C57B86599179CA60D78942 |
| 175 | 7A42B153D64D55FDF961139E80902ED30CC42C9F3582DC17 |
| 176 | 13D4273ABFDBC39490F785F7E906B8BA6552BAF65C144A7E |
| 177 | 4681726FEA8E96C1C5A2D0A2BC53EDEF3007EFA309411F2B |
| 178 | 20E714098CE8F0A7A3C4B6C4DA358B89566189C56F27794D |
| 179 | 75B2415CD9BDA5F2F691E3918F60DEDC0334DC903A722C18 |
| 180 | 1CDB2835B0D4CC9B9FF88AF8E609B7B56A5DB5F9531B4571 |
| 181 | 498E7D60E58199CECAADDFADB35CE2E03F08E0AC064E1024 |
| 182 | 2FE81B0683E7FFA8ACCBB9CBD53A8486596E86CA60287642 |
| 183 | 7ABD4E53D6B2AAFDF99EEC9E806FD1D30C3BD39F357D2317 |
| 184 | 132B27C5BF24C36B90088508E9F9B84565ADBA095CEB4A81 |
| 185 | 467E7290EA71963EC55DD05DBCACED1030F8EF5C09BE1FD4 |
| 186 | 201814F68C17F058A33BB63BDACA8B76569E893A6FD879B2 |
| 187 | 754D41A3D942A50DF66EE36E8F9FDE2303CBDC6F3A8D2CE7 |
| 188 | 1C2428CAB02BCC649F078A07E6F6B74A6AA2B50653E4458E |
| 189 | 49717D9FE57E9931CA52DF52B3A3E21F3FF7E05306B110DB |
| 190 | 2F171BF98318FF57AC34B934D5C584795991863560D776BD |
| 191 | 7A424EACD64DAA02F961EC618090D12C0CC4D360358223E8 |

TABLE 1-continued transmitter identification sequence

| No. | transmitter identification sequence |
|---|---|
| 192 | 6C2B273ABFDB3C6B90F77A0816F9B8BA9AADBAF65C14B581 |
| 193 | 397E726FEA8E693EC5A22F5D43ACEDEFCFF8EFA30941E0D4 |
| 194 | 5F1814098CE80F58A3C4493B25CA8B89A99E89C56F2786B2 |
| 195 | 0A4D415CD9BD5A0DF6911C6E709FDEDCFCCBDC903A72D3E7 |
| 196 | 63242835B0D433649FF8750719F6B7B595A2B5F9531BBA8E |
| 197 | 36717D60E5816631CAAD20524CA3E2E0C0F7E0AC064EEFDB |
| 198 | 50171B0683E70057ACCB46342AC58486A69186CA602889BD |
| 199 | 05424E53D6B25502F99E13617F90D1D3F3C4D39F357DDCE8 |
| 200 | 6CD427C5BF243C9490087AF71606B8459A52BA095CEBB57E |
| 201 | 39817290EA7169C1C55D2FA24353ED10CF07EF5C09BEE02B |
| 202 | 5FE714F68C170FA7A33B49C425358B76A961893A6FD8864D |
| 203 | 0AB241A3D9425AF2F66E1C917060DE23FC34DC6F3A8DD318 |
| 204 | 63DB28CAB02B339B9F0775F81909B74A955DB50653E4BA71 |
| 205 | 368E7D9FE57E66CECA5220AD4C5CE21FC008E05306B1EF24 |
| 206 | 50E81BF9831800A8AC3446CB2A3A8479A66E863560D78942 |
| 207 | 05BD4EACD64D55FDF961139E7F6FD12CF33BD3603582DC17 |
| 208 | 6C2BD8C5BFDBC39490F785F716F947459AAD45095C144A7E |
| 209 | 397E8D90EA8E96C1C5A2D0A243AC1210CFF8105C09411F2B |
| 210 | 5F18EBF68CE8F0A7A3C4B6C425CA7476A99E763A6F27794D |
| 211 | 0A4DBEA3D9BDA5F2F691E391709F2123FCCB236F3A722C18 |
| 212 | 6324D7CAB0D4CC9B9FF88AF819F6484A95A24A06531B4571 |
| 213 | 3671829FE58199CECAADDFAD4CA31D1FC0F71F53064E1024 |
| 214 | 5017E4F983E7FFA8ACCBB9CB2AC57B79A691793560287642 |
| 215 | 0542B1ACD6B2AAFDF99EEC9E7F902E2CF3C42C60357D2317 |
| 216 | 6CD4D83ABF24C36B90088508160647BA9A5245F65CEB4A81 |
| 217 | 39818D6FEA71963EC55DD05D435312EFCF0710A309BE1FD4 |
| 218 | 5FE7EB098C17F058A33BB63B25357489A96176C56FD879B2 |
| 219 | 0AB2BE5CD942A50DF66EE36E706021DCFC3423903A8D2CE7 |
| 220 | 63DBD735B02BCC649F078A07190948B5955D4AF953E4458E |
| 221 | 368E8260E57E9931CA52DF524C5C1DE0C0081FAC06B110DB |
| 222 | 50E8E4068318FF57AC34B9342A3A7B86A66E79CA60D776BD |
| 223 | 05BDB153D64DAA02F961EC617F6F2ED3F33B2C9F358223E8 |
| 224 | 6C2B273A4024C39490F77A08E90647459AADBAF6A3EB4A7E |
| 225 | 397E726F157196C1C5A22F5DBC531210CFF8EFA3F6BE1F2B |
| 226 | 5F1814097317F0A7A3C4493BDA357476A99E89C590D8794D |
| 227 | 0A4D415C2642A5F2F6911C6E8F602123FCCBDC90C58D2C18 |
| 228 | 632428354F2BCC9B9FF87507E609484A95A2B5F9ACE44571 |
| 229 | 36717D601A7E99CECAAD2052B35C1D1FC0F7E0ACF9B11024 |
| 230 | 50171B067C18FFA8ACCB4634D53A7B79A69186CA9FD77642 |
| 231 | 05424E53294DAAFDF99E1361806F2E2CF3C4D39FCA822317 |
| 232 | 6CD427C540DBC36B90087AF7E9F947BA9A52BA09A3144A81 |
| 233 | 39817290158E963EC55D2FA2BCAC12EFCF07EF5CF6411FD4 |
| 234 | 5FE714F673E8F058A33B49C4DACA7489A961893A902779B2 |
| 235 | 0AB241A326BDA50DF66E1C918F9F21DCFC34DC6FC5722CE7 |
| 236 | 63DB28CA4FD4CC649F0775F8E6F648B5955DB506AC1B458E |
| 237 | 368E7D9F1A819931CA5220ADB3A31DE0C008E053F94E10DB |
| 238 | 50E81BF97CE7FF57AC3446CBD5C57B86A66E86359F2876BD |
| 239 | 05BD4EAC29B2AA02F961139E80902ED3F33BD360CA7D23E8 |
| 240 | 6C2BD8C540243C6B90F785F7E906B8BA9AAD4509A3EBB581 |
| 241 | 397E8D901571693EC5A2D0A2BC53EDEFCFF8105CF6BEE0D4 |
| 242 | 5F18EBF673170F58A3C4B6C4DA358B89A99E763A90D886B2 |
| 243 | 0A4DBEA326425A0DF691E3918F60DEDCFCCB236FC58DD3E7 |
| 244 | 6324D7CA4F2B33649FF88AF8E609B7B595A24A06ACE4BA8E |
| 245 | 3671829F1A7E6631CAADDFADB35CE2E0C0F71F53F9B1EFDB |
| 246 | 5017E4F97C180057ACCBB9CBD53A8486A69179359FD789BD |
| 247 | 0542B1AC294D5502F99EEC9E806F0D1D3F3C42C60CA82DCE8 |
| 248 | 6CD4D83A40DB3C9490088508E9F9B8459A5245F6A314B57E |
| 249 | 39818D6F158E69C1C55DD05DBCACED10CF0710A3F641E02B |
| 250 | 5FE7EB0973E80FA7A33BB63BDACA8B76A96176C59027864D |
| 251 | 0AB2BE5C26BD5AF2F66EE36E8F9FDE23FC342390C572D318 |
| 252 | 63DBD7354FD4339B9F078A07E6F6B74A955D4AF9AC1BBA71 |
| 253 | 368E82601A8166CECA52DF52B3A3E21FC0081FACF94EEF24 |
| 254 | 50E8E4067CE700A8AC34B934D5C58479A66E79CA9F288942 |
| 255 | 05BDB15329B255FDF961EC618090D12CF33B2C9FCA7DDC17 |

Figure 6:
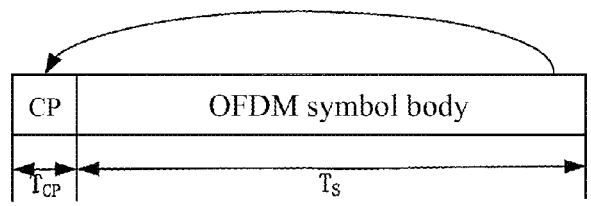
FIG. 6 is a structural view of the OFDM symbol in FIG. 3.

FIG. 6 is a structural view of the OFDM symbol in FIG. 3.

As shown in the figure, the OFDM symbol comprises a circular prefix (CP) and an OFDM symbol body, the length TCP of the circular prefix is 51.2 us, the length TS of the OFDM symbol is 409.6 us.

Figure 7:
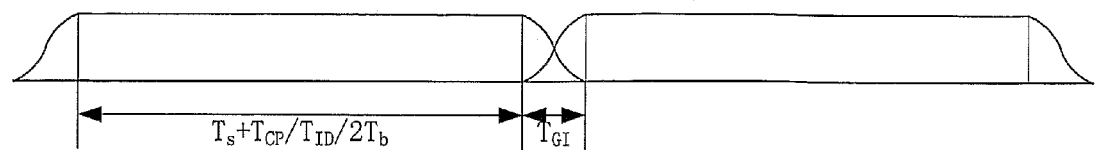
FIG. 7 is a schematic view of overlapping between guard intervals.

The transmitter identification signal, the synchronous signal and the neighboring OFDM symbol in FIG. 3 are overlapped with guard intervals (GD). The length TGD of the guard interval GD is 2.4 us. An end part GD of a former symbol and a head part GD of a latter symbol in the neighboring symbols are overlapped after weighting with a window function, as shown in FIG. 7.

The expression of the window function is as follows:

$$w(t) = \begin{cases} 0.5 + 0.5\cos(\pi + \pi t/T_{GD}), & 0 \le t \le T_{GD} \\ 1, & T_{GD} < t < T - T_{GD} \\ 0.5 + 0.5\cos(\pi + \pi(T-t)/T_{GD}), & T - T_{GD} \le t \le T \end{cases}$$

Figure 8:
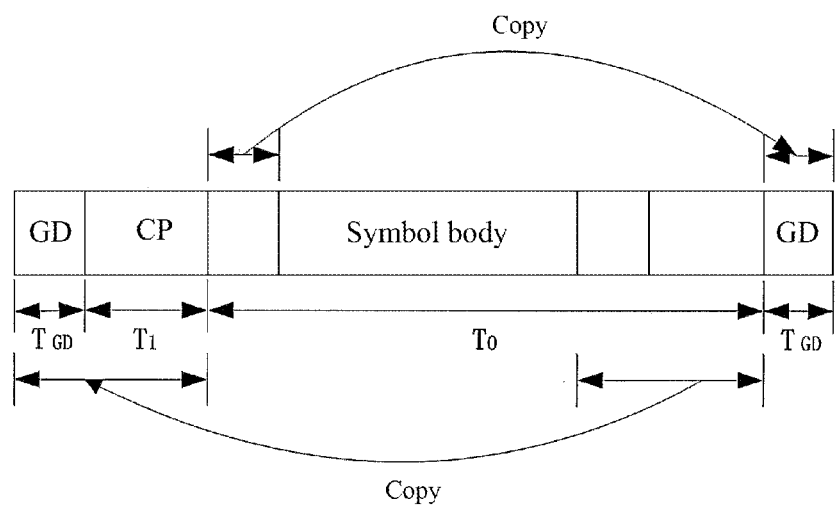
FIG. 8 is a structural schematic view of an OFDM symbol.

The selection of the guard interval signals is as shown in FIG. 8. For the transmitter identification signal, the synchronous signal and the OFDM symbol, the value of the T0 and T1 are as shown in Table 2.

TABLE 2 the value table of the guard interval signal

| signal | T0 (us) | T1 (us) |
|---|---|---|
| transmitter identification signal | 25.6 | 10.4 |
| Synchronous signal | 409.6 | 0 |
| OFDM symbol | 409.6 | 51.2 |

The sub-systems in FIG. 2 will be described in detail in the follows.

Figure 9:
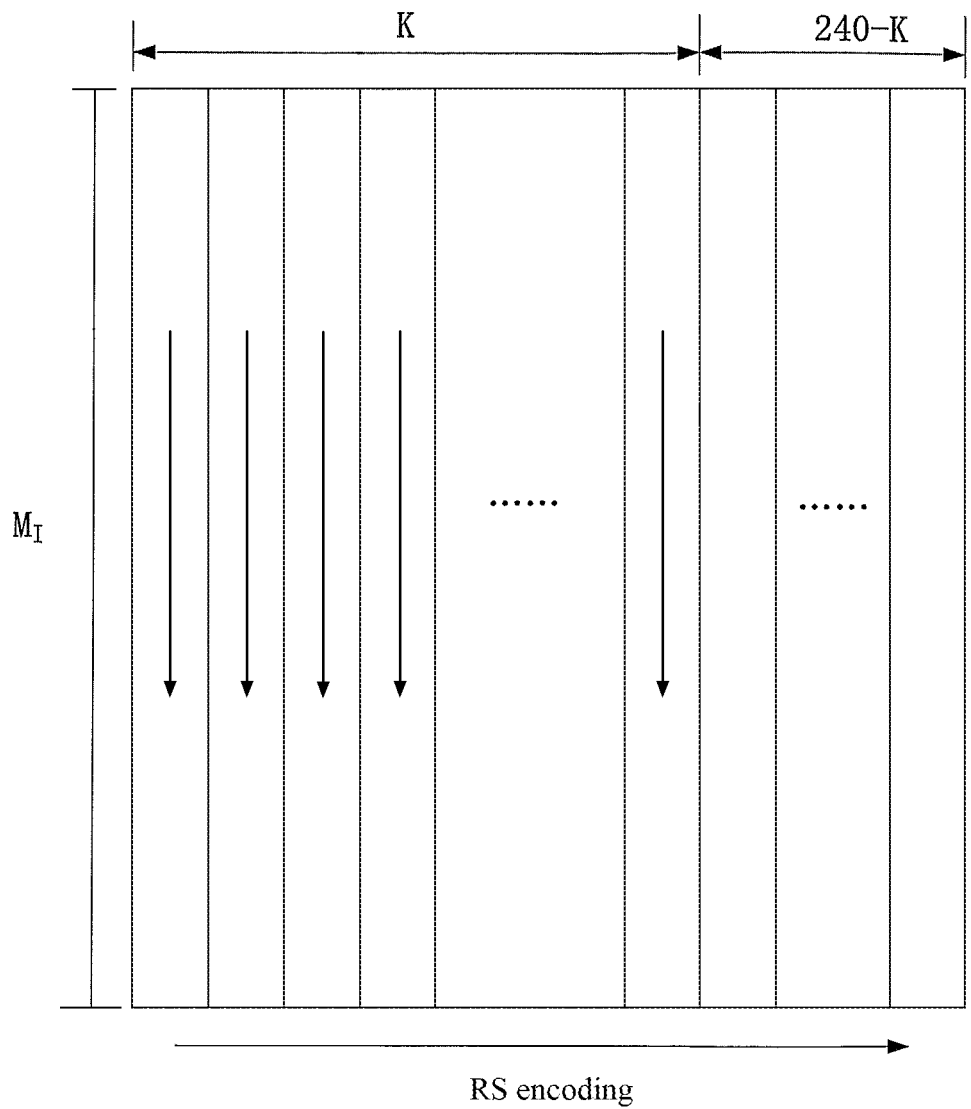
FIG. 9 is a schematic view of a byte interleaver with RS (240, K) encoding.

FIG. 9 is a schematic view of a byte interleaver with RS (240, K) encoding.

As shown in the figure, the byte interleaver is a block interleaver with M1 rows and 240 columns. The row number M1 of the byte interleaver is determined by the byte interleaving mode and the LDPC code rate as shown in Table 3:

TABLE 3 the value table of the parameter M1 of the byte interleaver

| | Interleaving mode 1 | Interleaving mode 2 | Interleaving mode 3 |
|---|---|---|---|
| 1/2 LDPC code | MI = 72 | MI = 144 | MI = 288 |
| 3/4 LDPC code | MI = 108 | MI = 216 | MI = 432 |

The RS code adopts a RS(240, K) shortened code with a code length of 240 bytes. The code is generated by shortening the original RS(255, M) system code, in which M=K+15 where K is the byte number of information sequence in a code word while the check byte number is (240-K). The RS(240, K) code provides 4 kinds of modes with K values of K=240, K=224, K=192 and K=176 respectively.

Each code bit of the RS(240, K) code is picked from a domain GF(256) which has a generating polynomial $p(x)=x^8+x^4+x^3+x^2+1$.

The shortened code RS (240, K) is encoded as follows:

15 full "0" byte are added in front of K input information bytes $(m_0, m_1, \ldots, m_{K-1})$, thus an input sequence $(0, \ldots 0, m_0, m_1, \ldots, m_{K-1})$ as the original RS (255, M) system code is constructed, after encoding the generated code word is $(0, \ldots, 0, m_0, m_1, \ldots, m_{K-1}, p_0, p_1, \ldots, p_{255-M-1})$, then the added bytes are removed from the code word, thus obtaining a code word $(m_0, m_1, \ldots, m_{K-1}, p_0, p_1, \ldots, p_{255-M-1})$ as a shortened RS code with 240 bytes.

The expression of the generating polynomial of the RS (240, K) code is as follows:

$$g(x) = \sum_{i=0}^{240-K} g_i x^i,$$

The expression of the inputted information sequence polynomial is as follows:

$$m(x) = \sum_{i=0}^{K-1} m_i x^i,$$

The expression of the outputted system code polynomial is as follows:

$$C(x) = \sum_{i=0}^{239} c_i x^i = x^{240-K} m(x) + r(x) \text{ in which } r(x) = \frac{x^{240-K} gm(x)}{g(x)}$$

The coefficients $g_i$ of the generated polynomial expression of the RS (240, 224) are as follows:

| i | $g_i$ |
|---|---|
| 0 | 79 |
| 1 | 44 |
| 2 | 81 |
| 3 | 100 |
| 4 | 49 |
| 5 | 183 |
| 6 | 56 |
| 7 | 17 |
| 8 | 232 |
| 9 | 187 |
| 10 | 126 |
| 11 | 104 |
| 12 | 31 |
| 13 | 103 |
| 14 | 52 |
| 15 | 118 |
| 16 | 1 |

The coefficients $g_i$ of the generated polynomial expression of the RS (240, 192) are as follows:

| i | $g_i$ |
|---|---|
| 0 | 228 |
| 1 | 231 |
| 2 | 214 |
| 3 | 81 |
| 4 | 113 |
| 5 | 204 |
| 6 | 19 |
| 7 | 169 |
| 8 | 10 |
| 9 | 244 |
| 10 | 117 |
| 11 | 219 |
| 12 | 130 |
| 13 | 12 |
| 14 | 160 |
| 15 | 151 |
| 16 | 195 |
| 17 | 170 |
| 18 | 150 |
| 19 | 151 |
| 20 | 251 |

| i | $g_i$ |
|---|---|
| 21 | 218 |
| 22 | 245 |
| 23 | 166 |
| 24 | 149 |
| 25 | 183 |
| 26 | 109 |
| 27 | 176 |
| 28 | 148 |
| 29 | 218 |
| 30 | 21 |
| 31 | 161 |
| 32 | 240 |
| 33 | 25 |
| 34 | 15 |
| 35 | 71 |
| 36 | 62 |
| 37 | 5 |
| 38 | 17 |
| 39 | 32 |
| 40 | 157 |
| 41 | 194 |
| 42 | 73 |
| 43 | 195 |
| 44 | 218 |
| 45 | 14 |
| 46 | 12 |
| 47 | 122 |
| 48 | 1 |

The coefficients $g_i$ of the generated polynomial expression of the RS (240, 176) are as follows:

| i | $g_i$ |
|---|---|
| 0 | 106 |
| 1 | 117 |
| 2 | 43 |
| 3 | 201 |
| 4 | 70 |
| 5 | 139 |
| 6 | 47 |
| 7 | 64 |
| 8 | 127 |
| 9 | 181 |
| 10 | 48 |
| 11 | 25 |
| 12 | 230 |
| 13 | 85 |
| 14 | 31 |
| 15 | 157 |
| 16 | 156 |
| 17 | 123 |
| 18 | 88 |
| 19 | 44 |
| 20 | 149 |
| 21 | 223 |
| 22 | 165 |
| 23 | 36 |
| 24 | 127 |
| 25 | 46 |
| 26 | 142 |
| 27 | 212 |
| 28 | 233 |
| 29 | 71 |
| 30 | 149 |
| 31 | 88 |
| 32 | 165 |
| 33 | 227 |
| 34 | 80 |
| 35 | 105 |
| 36 | 44 |
| 37 | 72 |
| 38 | 147 |
| 39 | 55 |
| 40 | 60 |
| 41 | 85 |
| 42 | 70 |
| 43 | 132 |
| 44 | 229 |
| 45 | 230 |
| 46 | 217 |
| 47 | 155 |
| 48 | 38 |
| 49 | 112 |
| 50 | 43 |
| 51 | 174 |
| 52 | 169 |
| 53 | 136 |
| 54 | 23 |
| 55 | 60 |
| 56 | 186 |
| 57 | 63 |
| 58 | 198 |
| 59 | 205 |
| 60 | 135 |
| 61 | 171 |
| 62 | 40 |
| 63 | 159 |
| 64 | 1 |

The method of encoding and the byte interleaving is as follows: data block is transmitted by byte, and inputted into the block interleaver from left to right column by column until the Kth column with each column having MI bytes. The RS encoding is performed by row, and the verifying bytes are filled to the latter (240-K) columns. The encoded data is outputted from left to right column by column as the order of inputting until all 240 columns are finished.

The above RS encoding and the byte interleaving are undertaken based on physical logical channels. The upper layer packages of the same physical logical channel are inputted into the byte interleaver in turn for byte interleaving and RS encoding. The first byte of the $0^{th}$ column in the byte interleaver is defined as a start byte of the byte interleaver. Each output of the byte interleaver (M1×240 bytes) are always mapped to a integer number of time slots to be transmitted, in which the start byte of the byte interleaver is mapped to a start point of a certain time slot to be transmitted.

After the RS encoding and byte interleaving, the transmission data is transmitted based on the rule of bit of higher order having higher priority for transmitting, and each byte is mapped to form a 8-bit stream to be transmitted into the LDPC encoder. The first byte of the $0^{th}$ column in the byte interleaver is defined as the start byte of the byte interleaver with the bit of highest order being mapped to the first bit of the LDPC inputting bit block. The LDPC encoding configuration is shown in Table 4:

TABLE 4

| LDPC encoding configuration | | |
|---|---|---|
| Code rate | The length of the inputted block | The length of the outputted block |
| 1/2 | 4608 bits | 9216 bits |
| 3/4 | 6912 bits | 9216 bits |

The LDPC encoding is given by a check matrix H, and the generating method of the matrix H is as follows:

1) a generating method of a $\frac{1}{2}$ LDPC code check matrix

| | | | | | |
|---|---|---|---|---|---|
| 0 | 6 | 12 | 18 | 25 | 30 |
| 0 | 7 | 19 | 26 | 31 | 5664 |
| 0 | 8 | 13 | 20 | 32 | 8270 |
| 1 | 6 | 14 | 21 | 3085 | 8959 |
| 1 | 15 | 27 | 33 | 9128 | 9188 |
| 1 | 9 | 16 | 34 | 8485 | 9093 |
| 2 | 6 | 28 | 35 | 4156 | 7760 |
| 2 | 10 | 17 | 7335 | 7545 | 9138 |
| 2 | 11 | 22 | 5278 | 8728 | 8962 |
| 3 | 7 | 2510 | 4765 | 8637 | 8875 |
| 3 | 4653 | 4744 | 7541 | 9175 | 9198 |
| 3 | 23 | 2349 | 9012 | 9107 | 9168 |
| 4 | 7 | 29 | 5921 | 7774 | 8946 |
| 4 | 7224 | 8074 | 8339 | 8725 | 9212 |
| 4 | 4169 | 8650 | 8780 | 9023 | 9159 |
| 5 | 8 | 6638 | 8986 | 9064 | 9210 |
| 5 | 2107 | 7787 | 8655 | 9141 | 9171 |
| 5 | 24 | 5939 | 8507 | 8906 | 9173 |

The following is a circular program segment for generating the $$\frac{1}{2}$$

LDPC code check matrix:
for I=1:18;
  using the I$^{th}$ row of the above table, and being designated as hexp;
  for J=1:256;
    row=(J−1)*18+I;
    for K=1:6;

column=[(⌊hexp(K)/36⌋+J−1)% 256]*36+(hexp(K)%36)+1.

The row$^{th}$ row and the column$^{th}$ column of the parity check matrix being non-zero elements;

end;
    end;
    end;

2) a generating method of a $$\frac{3}{4}$$

LDPC code check matrix

| | | | | | | | | | | | |
|---|---|---|---|---|---|---|---|---|---|---|---|
| 0 | 3 | 6 | 12 | 16 | 18 | 21 | 24 | 27 | 31 | 34 | 7494 |
| 0 | 4 | 10 | 13 | 25 | 28 | 5233 | 6498 | 7018 | 8358 | 8805 | 9211 |
| 0 | 7 | 11 | 19 | 22 | 6729 | 6831 | 7913 | 8944 | 9013 | 9133 | 9184 |
| 1 | 3 | 8 | 14 | 17 | 20 | 29 | 32 | 5000 | 5985 | 7189 | 7906 |
| 1 | 9 | 4612 | 5523 | 6456 | 7879 | 8487 | 8952 | 9081 | 9129 | 9164 | 9214 |
| 1 | 5 | 23 | 26 | 33 | 35 | 7135 | 8525 | 8983 | 9015 | 9048 | 9154 |
| 2 | 3 | 30 | 3652 | 4067 | 5123 | 7808 | 7838 | 8231 | 8474 | 8791 | 9162 |
| 2 | 35 | 3774 | 4310 | 6827 | 6917 | 8264 | 8416 | 8542 | 8834 | 9044 | 9089 |
| 2 | 15 | 631 | 1077 | 6256 | 7859 | 8069 | 8160 | 8657 | 8958 | 9094 | 9116 |

The following a is a circular program segment for generating the $$\frac{3}{4}$$

LDPC code check matrix:
  for I=1:9;
  using the I$^{th}$ row of the above table, and being designated as hexp;
  for J=1:256;
    row=(J−1)*9+I;
    for K=1:12;

column=[(⌊hexp(K)/36⌋+J−1)%256]*36+(hexp(K)%36)+1.

The row$^{th}$ row and the column$^{th}$ column of the parity check matrix being non-zero elements;

end;
      end;
    end;

FIG. 10 is a schematic view of bit interleaving to the bit stream being LDPC encoded.

As shown in the figure, the bit interleaver uses a 384×360 block interleaver. The LDPC encoded binary sequence is written into each row of the block interleaver in turn in the order from up to low until the whole interleaver is filled up, then it is read from left to right in turn based on column. The output of the bit interleaver is aligned with the time slot, i.e., the first bit transmitted in each time slot is always defined as the first bit outputted from the bit interleaver.

Figure 13:
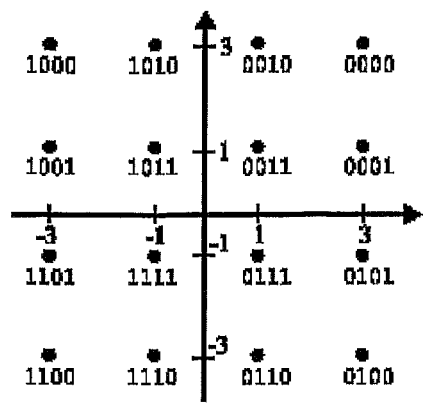

FIGS. 11, 12 and 13 are BPSK constellation mapping view, QPSK constellation mapping view and 16 QAM constellation mapping view respectively. The power normalization factors corresponding to the BPSK, QPSK and 16 QAM constellation mapping are $1/\sqrt{2}$, $1/\sqrt{2}$, $1/\sqrt{10}$ respectively.

Figure 14:
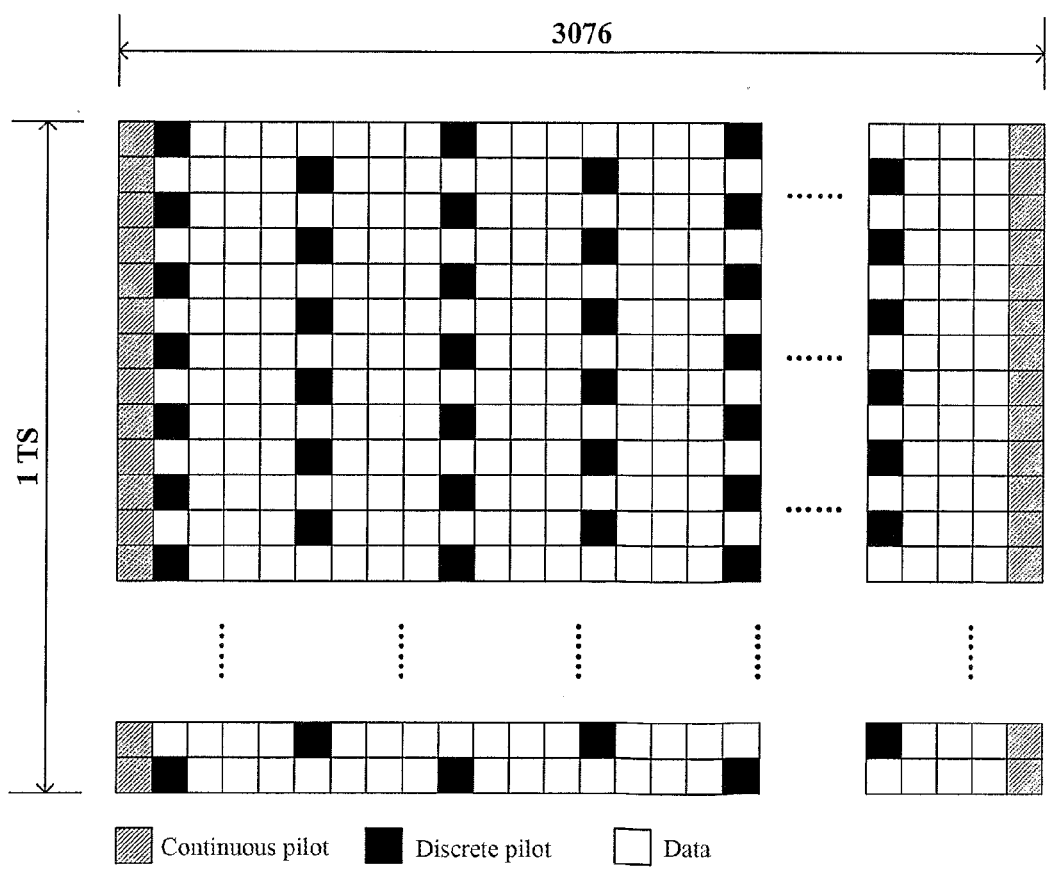
FIG. 14 is a pilot multiplexing schematic view of allocating sub-carriers of the OFDM symbol to the data symbol, discrete pilot and continuous pilot.

FIG. 14 is a pilot multiplexing schematic view of allocating sub-carriers of the OFDM symbol to the data symbol, discrete pilot and continuous pilot.

As shown in the figure, the part of oblique line is a continuous pilot signal, the black part is a discrete pilot signal, the white part is data obtained by constellation mapping. The pilot multiplexing procedure multiplexes the data symbol, the discrete pilot and the continuous pilot, forming an OFDM frequency-domain symbol. Each OFDM symbol comprises 3076 sub-carriers (0-3075), denoting as X(i), i=0, 1, . . . 3075.

Figure 15:
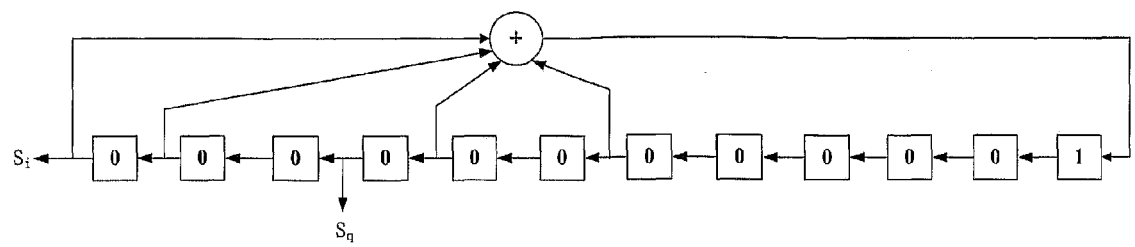
FIG. 15 is a schematic view of a generating method for PRBS.

In FIG. 15, the continuous pilots use the 0th, 22th, 78th, 92th, 168th, 174th, 244th, 274th, 278th, 344th, 382th, 424th, 426th, 496th, 500th, 564th, 608th, 650th, 688th, 712th, 740th, 772th, 846th, 848th, 932th, 942th, 950th, 980th, 1012th, 1066th, 1126th, 1158th, 1214th, 1244th, 1276th, 1280th, 1326th, 1378th, 1408th, 1508th, 1537th, 1538th, 1566th, 1666th, 1736th, 1748th, 1794th, 1798th, 1830th, 1860th, 1916th, 1948th, 2008th, 2062th, 2094th, 2124th, 2132th, 2142th, 2226th, 2228th, 2302th, 2334th, 2362th, 2386th, 2424th, 2466th, 2510th, 2574th, 2578th, 2648th, 2650th, 2692th, 2730th, 2796th, 2800th, 2830th, 2900th, 2906th, 2982th, 2996th, 3052th, 3075th sub-carriers, 82 in total.

The 22th, 78th, 92th, 168th, 174th, 244th, 274th, 278th, 344th, 382th, 424th, 426th, 496th, 500th, 564th, 608th, 650th, 688th, 712th, 740th, 772th, 846th, 848th, 932th, 942th, 950th, 980th, 1012th, 1066th, 1126th, 1158th, 1214th, 1860th, 1916th, 1948th, 2008th, 2062th, 2094th, 2124th, 2132th, 2142th, 2226th, 2228th, 2302th, 2334th, 2362th, 2386th, 2424th, 2466th, 2510th, 2574th, 2578th, 2648th, 2650th, 2692th, 2730th, 2796th, 2800th, 2830th, 2900th, 2906th, 2982th, 2996th, 3052th carriers, 64 in total, carry 16 bit system information. The system information bits are transmitted by 4 times repeat encoding to be mapped to 4 continuous pilots. The mapping relationship is shown in Table 5, the detailed expression of the system information is shown in Table 6, with the remaining continuous pilots transmitting "0".

TABLE 5 the repeat encoding manner on continuous pilot

| bit | Numbering with sub-carrier |
| --- | --- |
| 0 | 22, 650, 1860, 2466 |
| 1 | 78, 688, 1916, 2510 |
| 2 | 92, 712, 1948, 2574 |
| 3 | 168, 740, 2008, 2578 |
| 4 | 174, 772, 2062, 2648 |
| 5 | 244, 846, 2094, 2650 |
| 6 | 274, 848, 2124, 2692 |
| 7 | 278, 932, 2132, 2730 |
| 8 | 344, 942, 2142, 2796 |
| 9 | 382, 950, 2226, 2800 |
| 10 | 424, 980, 2228, 2830 |
| 11 | 426, 1012, 2302, 2900 |
| 12 | 496, 1066, 2334, 2906 |
| 13 | 500, 1126, 2362, 2982 |
| 14 | 564, 1158, 2386, 2996 |
| 15 | 608, 1214, 2424, 3052 |

TABLE 6 system information transmitted on continuous pilot

| Bit | Information |
| --- | --- |
| 0~5 | Time slot |
| 6 | Bit interleaver synchronous identification |
| 7 | Control logical channel modify indication |
| 8~15 | reserved |

Each bit in table 6 contains the following information:
1) bit.0~bit 5 are the current time slot number ranging from 0 to 39;
2) bit 6 is the bit interleaver synchronous identification, when the bit is "1", the current time slot is identified as the start time slot of the byte interleaver;
3) bit 7 is a control logical channel modify indication which indicates modification of the terminal's control logical channel configuration information by differential modulation. The differential modulation is as follows: supposing the bit 7 in the former frame transmitting a (zero or 1), and the system control channel configuration information will be modified in the next frame, the $\bar{a}$ is transmitted in the current frame and remains until next modification.

4) bit 8~bit 15 are reserved.

The continuous pilots are mapped to the sub-carriers in the manner of $0 \to \sqrt{2}/2 + \sqrt{2}/2j$, $1 \to -\sqrt{2}/2 - \sqrt{2}/2j$. The same continuous sub-carrier points of different OFDM symbols in the same time slot transmit the same symbols.

The number OFDM symbol in each time slot is designated as n, $0 \leq n \leq 52$; m is the sub-carrier number corresponding to the discrete pilot in each OFDM symbol, and m is:

$$\text{if } \mod(n, 2) == 0 \ m = \begin{cases} 8p+1, & p = 0, 1, 2, \ldots, 191 \\ 8p+3, & p = 192, 193, 194, \ldots, 383 \end{cases}$$

$$\text{if } \mod(n, 2) == 1 \ m = \begin{cases} 8p+5, & p = 0, 1, 2, \ldots, 191 \\ 8p+7, & p = 192, 193, 194, \ldots, 383 \end{cases}$$

All discrete pilots are set to 1+0j.

In FIG. 14, data signals are mapped in the order of sub-carriers, OFDM symbols. In the 138330 data sub-carriers of each time-slot, the former 138240 sub-carriers carry the complex symbols outputted from the symbol interleaver, and the latter 90 symbols being filled with zero.

All symbols (effective sub-carriers) on the time-frequency grid of FIG. 14 comprise data sub-carriers, discrete pilots and continuous pilots etc., which are scrambled by the same complex pseudo-random sequence $P_c(i)$. The generating manner of the complex pseudo-random sequence $P_c(i)$ is as follows:

$$P_c(i) = \frac{\sqrt{2}}{2}[(1 - 2S_i(i)) + j(1 - 2S_q(i))]$$

in which $S_i(i)$ and $S_q(i)$ are binary pseudo-random sequences (PRBS).

FIG. 15 is a schematic view of the PRBS generating method.

As shown in the Figure, the PRBS generating polynomial is: x12+x11+x8+x6+1 which is corresponding to the shift register structure shown in the figure. The initial value of the shift register is determined by scrambling mode with the corresponding relationships as follows:
1) scrambling mode 0: initial value 0000 0000 0001
2) scrambling mode 1: initial value 0000 1001 0011
3) scrambling mode 2: initial value 0000 0100 1100
4) scrambling mode 3: initial value 0010 1011 0011
5) scrambling mode 4: initial value 0111 0100 0100
6) scrambling mode 5: initial value 0100 0100 1100
7) scrambling mode 6: initial value 0001 0110 1101
8) scrambling mode 7: initial value 1010 1011 0011
PRBS is reset at the start of each time-slot, all time slots being scrambled by the same pattern of scrambling code.

The scrambling code is obtained by complex multiplication of the complex symbol on the effective sub-carriers with the complex pseudo-random sequence $P_c(i)$, the expression of the scrambling code is as follows:

$$Y_n(i) = X_n(i) \times P_c(n \times 3076 + i), \ 0 \leq i \leq 3075, \ 0 \leq n \leq 52$$

in which the $X_n(i)$ is the $i^{th}$ effective sub-carrier on the $n^{th}$ OFDM symbol in each time slot before scrambling and the $Y_n(i)$ is the effective sub-carrier after scrambling.

Figure 16:
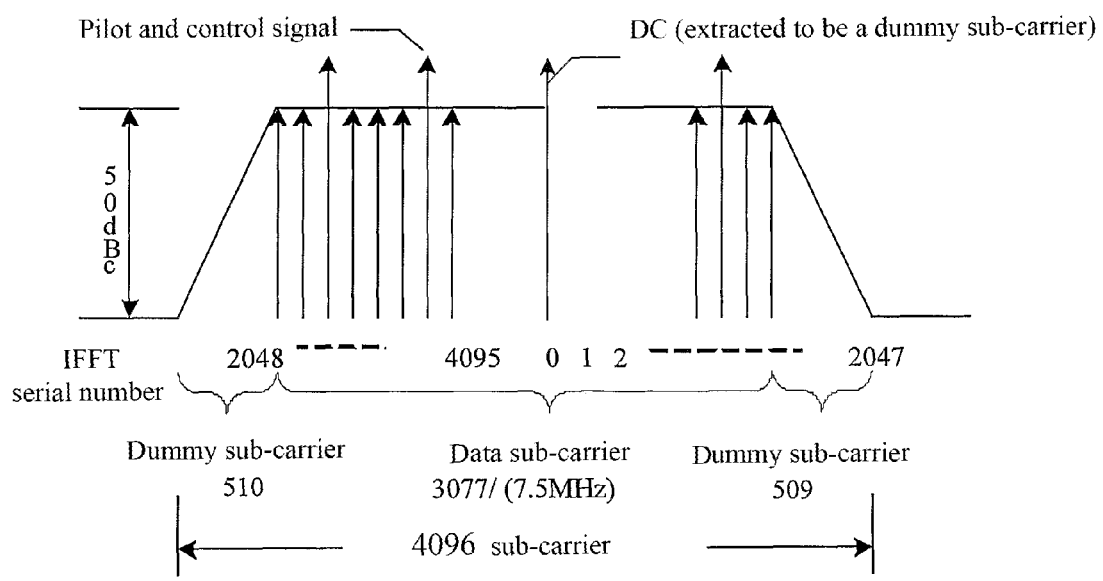
FIG. 16 is a schematic view of a sub-carrier structure of the OFDM symbol.

FIG. 16 is a schematic view of a sub-carrier structure of the OFDM symbol.

The OFDM sub-carriers X(i), i=0, 1, ..., 3075 after being inserted with pilot and scrambled generate an OFDM time-domain symbol after subjected to IFFT transformation. The IFFT transforming manner is as follows:

$$y(t) = \frac{1}{\sqrt{4096}} \sum_{n=0}^{4095} Y(n)e^{j2\pi \frac{nf_s t}{4096}}, 0 \le t \le 409.6\,us, f_s = 10 \text{ MHz}$$

In which $$Y(n) = \begin{cases} X(n-1), & 1 \le n \le 1538 \\ X(n-1020), & 2558 \le n \le 4095 \\ 0, & n=0 \text{ or } 1539 \le n \le 2557 \end{cases}$$

The OFDM symbol after IFFT transformation is added with circular prefix (CP) to form a time-domain OFDM symbol as shown in FIG. 6.

The modulated OFDM symbol is added with guard intervals, synchronous signal, and transmitter identification signal in turn according to the frame structure as shown in FIG. 3 to form a time-slot. And then 40 time-slots are concatenated to form a physical signal frame.

The time-domain shaping filter used in the system is a FIR filter satisfying ripple attenuation <1 dB within the bandwidth of a signal and attenuation >40 dBc outside the bandwidth thereof. The frequency bandwidth is 8 MHz which is compatible with conventional analog television bandwidth. The system sampling rate is 10 MHz, and the signal bandwidth of each channel is 7.512 MHz.

The data stream of the upper layer of the system can adopt video streams including H.264, AVS, MPEG-2, MPEG-4 etc, audio streams such as AC-3, AAC etc and other various types of data formats. Encoding data can includes various types of broadcast data including single medium (such as video source encoding, text) and multimedia (mixture of audio, video, text and data).

Although the present invention is described in conjunction with the examples and embodiments, the present invention is not intended to be limited thereto. On the contrary, the present invention obviously covers the various modifications and may equivalences, which are all enclosed in the scope of the following claims.

What is claimed is:

1. A multi-carrier digital mobile multimedia broadcast system comprising a transmitter and a receiver, the transmitter comprising:
a RS encoding and byte interleaving module for RS encoding and byte interleaving an upper layer data stream based on a physical logical channel;
a LDPC encoder for LDPC encoding the data outputted from the RS encoding and byte interleaving module to obtain bit data;
a bit interleaver for bit interleaving the bit data outputted from the LDPC encoder;
a constellation mapping module, in which the data outputted from the bit interleaver is constellation mapped;
a frequency-domain symbol generator for multiplexing together a discrete pilot, a continuous pilot containing system information and data symbol being constellation mapped to form an OFDM frequency-domain symbol;
a scrambler for scrambling the OFDM frequency-domain symbol using pseudo-random sequence;
an IFFT transformer for performing IFFT transformation to the frequency-domain symbol outputted from the scrambler to generate an OFDM time-domain symbol; and
a time-domain framing device for adding a beacon in formt of the OFDM time-domain symbol to form a time slot and concatenating the time slots to form a physical signal frame, the beacon comprising a transmitter identification signal and synchronous sequences, the transmitter identification signal being obtained by performing BPSK mapping, IFFT transforming and circular extending with the frequency-domain random sequence in turn.

2. The multi-carrier digital mobile multimedia broadcast system according to claim 1, wherein the system uses any 8 MHz bandwidth in a wireless channel and is compatible with the bandwidth of conventional analog television.

3. The multi-carrier digital mobile multimedia broadcast system according to claim 1, wherein the sampling rate of the system is 10 MHz, and the signal bandwidth of each channel is 7.512 MHz.

4. The multi-carrier digital mobile multimedia broadcast system according to claim 1, wherein the upper layer data stream of the system comprises data stream including a video stream of H.264, AVS, MPEG-2 or MPEG-4 and an audio stream of AC-3 or AAC.

5. The multi-carrier digital mobile multimedia broadcast system according to claim 1, wherein the system is mainly used for mobile receiving.

6. The multi-carrier digital mobile multimedia broadcast system according to claim 1, wherein the system supports single frequency network and multi-frequency network modes.

7. The multi-carrier digital mobile multimedia broadcast system according to claim 1, wherein the system selects transmission mode and parameters based on the type of transmitted data and networking environments.

8. The multi-carrier digital mobile multimedia broadcast system according to claim 1, wherein the system provides a mixed transmission mode having a variety of data types.

9. The multi-carrier digital mobile multimedia broadcast system according to claim 1, wherein the physical logical channel includes a control logical channel and a service logical channel.

10. A digital information transmission method for a multi-carrier digital mobile multimedia broadcast system, comprising following steps:
RS encoding and byte interleaving an upper layer data stream with a RS encoding and byte interleaving module based on a physical logical channel, in which row numbers of module is determined by a byte interleaving mode and a LDPC code rate;
LDPC encoding the byte interleaved data by a LDPC encoder to obtain bit data;
bit interleaving the LDPC encoded bit data by a bit interleaver;
constellation mapping the bit interleaved data by a constellation mapping module;
multiplexing together discrete pilots, continuous pilots containing system information and data symbols being constellation mapped by a frequency-domain symbol generator to form an OFDM frequency-domain symbol;
scrambling the multiplexed OFDM frequency-domain symbol with a scrambler using a pseudo-random sequence;

performing IFFT transformation to the scrambled frequency-domain symbol to generate an OFDM time-domain symbol by an IFFT transformer;

concatenating the times slots which are formed by inserting a beacon to the time-domain OFDM symbol with a time-domain framing device to form a physical signal frame, the beacon comprising a transmitter identification signal and synchronous sequences; and transmitting the physical signal frame after low-pass filtering and orthogonal up-converting.

11. The digital information transmission method according to claim 10, wherein the method uses any 8 MHz bandwidth in a wireless channel and is compatible with the bandwidth of conventional analog television.

12. The digital information transmission method according to claim 10, wherein the sampling rate of the method is 10 MHz, and the signal bandwidth of each channel is 7.512 MHz.

13. The digital information transmission method according to claim 10, wherein the upper layer data stream of the system comprises data stream including a video stream of H.264, AVS, MPEG-2 or MPEG-4 and an audio stream of AC-3 or AAC.

14. The digital information transmission method according to claim 10, wherein the method is mainly used for mobile receiving.

15. The digital information transmission method according to claim 10, wherein the method supports single frequency network and multi-frequency network modes.

16. The digital information transmission method according to claim 10, wherein the method selects transmission mode and parameters based on the type of transmitted data and networking environments.

17. The digital information transmission method according to claim 10, wherein the method provides a mixed transmission mode having a variety of data types.

18. The digital information transmission method according to claim 10, wherein the physical logical channel includes a control logical channel and a service logical channel.

19. The digital information transmission method according to claim 10, wherein the upper layer data stream is composed of frames.

20. The digital information transmission method according to claim 10, wherein a length of the frame is 1 second.

21. The digital information transmission method according to claim 19, wherein each frame comprises 40 time slots each having a length of 25 ms.

22. The digital information transmission method according to claim 10, wherein the physical logical channel is transmitted in one or more time slots.

23. The digital information transmission method according to claim 21, wherein the time slot has a beacon and 53 OFDM symbols.

24. The digital information transmission method according to claim 10, wherein the beacon comprises a transmitter identification signal and 2 same synchronous sequences.

25. The digital information transmission method according to claim 24, wherein transmitter identification signal is obtained from a 191-point frequency-domain random sequence by subjecting to BPSK mapping, 256-point IFFT transforming and then extending from 104 points to 360 points.

26. The digital information transmission method according to claim 24, wherein the synchronous sequence is obtained by subjecting to BPSK mapping and IFFT transforming in turn after extracting the frequency-domain random sequence.

27. The digital information transmission method according to claim 26, wherein the frequency-domain random sequence is generated by a linear feedback shift register, and an initial value of the shift register is 01110101101, and the generating polynomial is $x^{11}+x^9+1$.

28. The digital information transmission method according to claim 27, wherein the frequency-domain random sequence is obtained by: extracting 1538 points from the sequence generated by the shift register, and performing BPSK mapping and 2048-point IFFT transforming in turn.

29. The digital information transmission method according to claim 24, wherein the transmitter identifier, the synchronous sequence and the OFDM symbol are overlapped by guard intervals having window function as follows:

$$w(t) = \begin{cases} 0.5 + 0.5\cos(\pi + \pi t/T_{GD}), & 0 \le t \le T_{GD} \\ 1, & T_{GD} < t < T - T_{GD} \\ 0.5 + 0.5\cos(\pi + \pi(T-t)/T_{GD}), & T - T_{GD} \le t \le T \end{cases}$$

Where t is the time variable, T is a constant, TGD is a length of the guard interval.

30. The digital information transmission method according to claim 29, wherein the length of the guard interval is 24 points.

31. The digital information transmission method according to claim 10, wherein the OFDM symbol is composed of an OFDM symbol body and a circular prefix.

32. The digital information transmission method according to claim 31, wherein the length of the OFDM body is 4096 points, and the length of the circular prefix is 512 points.

33. The digital information transmission method according to claim 10, wherein the RS encoding is a RS (240, K) shortening code generated by shortening an original RS (255, M) system code, where M=K+15, and K, M are information bit lengths.

34. The digital information transmission method according to claim 33, wherein each code bit of the RS (255, M) system code is chosen from a domain GF(256), the generating polynomial of the domain is $p(x)=x^8+x^4+x^3+x^2+1$.

35. The digital information transmission method according to claim 33, wherein the RS(240, K) includes 4 modes with K in the four modes having the following values respectively: K=240, K=224, K=192 and K=176.

36. The digital information transmission method according to claim 33, wherein the expression of the generating polynomial of the RS(240, K) is $$g(x) = \sum_{i=0}^{240-K} g_i x^i.$$

37. The digital information transmission method according to claim 35, wherein coefficients $g_i$ of the generated polynomial expression of the RS (240, 224) are as follows when K=224:

| i | gi |
|---|-----|
| 0 | 79 |
| 1 | 44 |
| 2 | 81 |
| 3 | 100 |

| i | gi |
|---|---|
| 4 | 49 |
| 5 | 183 |
| 6 | 56 |
| 7 | 17 |
| 8 | 232 |
| 9 | 187 |
| 10 | 126 |
| 11 | 104 |
| 12 | 31 |
| 13 | 103 |
| 14 | 52 |
| 15 | 118 |
| 16 | 1 |

The coefficients $g_i$ of the generated polynomial expression of the RS (240, 192) are as follows where K=192:

| i | gi |
|---|---|
| 0 | 228 |
| 1 | 231 |
| 2 | 214 |
| 3 | 81 |
| 4 | 113 |
| 5 | 204 |
| 6 | 19 |
| 7 | 169 |
| 8 | 10 |
| 9 | 244 |
| 10 | 117 |
| 11 | 219 |
| 12 | 130 |
| 13 | 12 |
| 14 | 160 |
| 15 | 151 |
| 16 | 195 |
| 17 | 170 |
| 18 | 150 |
| 19 | 151 |
| 20 | 251 |
| 21 | 218 |
| 22 | 245 |
| 23 | 166 |
| 24 | 149 |
| 25 | 183 |
| 26 | 109 |
| 27 | 176 |
| 28 | 148 |
| 29 | 218 |
| 30 | 21 |
| 31 | 161 |
| 32 | 240 |
| 33 | 25 |
| 34 | 15 |
| 35 | 71 |
| 36 | 62 |
| 37 | 5 |
| 38 | 17 |
| 39 | 32 |
| 40 | 157 |
| 41 | 194 |
| 42 | 73 |
| 43 | 195 |
| 44 | 218 |
| 45 | 14 |
| 46 | 12 |
| 47 | 122 |
| 48 | 1 |

The coefficients $g_i$ of the generated polynomial expression of the RS (240, 176) are as follows where K=176:

| i | gi |
|---|---|
| 0 | 106 |
| 1 | 117 |
| 2 | 43 |
| 3 | 201 |
| 4 | 70 |
| 5 | 139 |
| 6 | 47 |
| 7 | 64 |
| 8 | 127 |
| 9 | 181 |
| 10 | 48 |
| 11 | 25 |
| 12 | 230 |
| 13 | 85 |
| 14 | 31 |
| 15 | 157 |
| 16 | 156 |
| 17 | 123 |
| 18 | 88 |
| 19 | 44 |
| 20 | 149 |
| 21 | 223 |
| 22 | 165 |
| 23 | 36 |
| 24 | 127 |
| 25 | 46 |
| 26 | 142 |
| 27 | 212 |
| 28 | 233 |
| 29 | 71 |
| 30 | 149 |
| 31 | 88 |
| 32 | 165 |
| 33 | 227 |
| 34 | 80 |
| 35 | 105 |
| 36 | 44 |
| 37 | 72 |
| 38 | 147 |
| 39 | 55 |
| 40 | 60 |
| 41 | 85 |
| 42 | 70 |
| 43 | 132 |
| 44 | 229 |
| 45 | 230 |
| 46 | 217 |
| 47 | 155 |
| 48 | 38 |
| 49 | 112 |
| 50 | 43 |
| 51 | 174 |
| 52 | 169 |
| 53 | 136 |
| 54 | 23 |
| 55 | 60 |
| 56 | 186 |
| 57 | 63 |
| 58 | 198 |
| 59 | 205 |
| 60 | 135 |
| 61 | 171 |
| 62 | 40 |
| 63 | 159 |
| 64 | 1. |

38. The digital information transmission method according to claim 10, wherein the upper layer data stream is input into RS encoding and byte interleaving module column by column in byte, wherein the RS encoding is performed by rows, a start byte of the byte interleaving module is mapped to be transmitted on a start point of a certain time slot.

39. The digital information transmission method according to claim 10, wherein the length of the outputted block after LDPC encoding is 9216 bits with code rates of ½ and ¾ respectively;

Wherein the generating steps of the $\frac{1}{2}$ LDPC code check matrix is as follows:

Firstly constructing data matrix as follows

| 0 | 6    | 12   | 18   | 25   | 30   |
|---|------|------|------|------|------|
| 0 | 7    | 19   | 26   | 31   | 5664 |
| 0 | 8    | 13   | 20   | 32   | 8270 |
| 1 | 6    | 14   | 21   | 3085 | 8959 |
| 1 | 15   | 27   | 33   | 9128 | 9188 |
| 1 | 9    | 16   | 34   | 8485 | 9093 |
| 2 | 6    | 28   | 35   | 4156 | 7760 |
| 2 | 10   | 17   | 7335 | 7545 | 9138 |
| 2 | 11   | 22   | 5278 | 8728 | 8962 |
| 3 | 7    | 2510 | 4765 | 8637 | 8875 |
| 3 | 4653 | 4744 | 7541 | 9175 | 9198 |
| 3 | 23   | 2349 | 9012 | 9107 | 9168 |
| 4 | 7    | 29   | 5921 | 7774 | 8946 |
| 4 | 7224 | 8074 | 8339 | 8725 | 9212 |
| 4 | 4169 | 8650 | 8780 | 9023 | 9159 |
| 5 | 8    | 6638 | 8986 | 9064 | 9210 |
| 5 | 2107 | 7787 | 8655 | 9141 | 9171 |
| 5 | 24   | 5939 | 8507 | 8906 | 9173 |

Secondly, setting up a first cycle with cycle index I with the I ranging from 1 to 18, using the data of Ith row in the above table to form a sequence and denoting as hexp; nesting a second cycle with cycle index J within the first cycle in which J is ranged from 1 to 256, obtaining the row variable "row" of the $\frac{1}{2}$ LDPC code check matrix using the formula row=[(J−1)*18+I], then nesting a third cycle with a cycle index K under the row variable "row" in the second cycle with the K ranging from 1 to 6, the Kth data of the data sequence hexp being denoted as hexp(K), and obtaining the $\frac{1}{2}$ LDPC code check matrix according to the following formula:

column=Mod [($\lfloor h\mathrm{exp}(K)/36 \rfloor$+J−1),256]×36+Mod [$h\mathrm{exp}(K)$,36]+1;

Wherein the generating steps of the $\frac{3}{4}$ LDPC code check matrix is as follows:
Firstly, constructing data matrix as the following table:

| 0 | 3  | 6    | 12   | 16   | 18   | 21   | 24   | 27   | 31   | 34   | 7494 |
|---|----|------|------|------|------|------|------|------|------|------|------|
| 0 | 4  | 10   | 13   | 25   | 28   | 5233 | 6498 | 7018 | 8358 | 8805 | 9211 |
| 0 | 7  | 11   | 19   | 22   | 6729 | 6831 | 7913 | 8944 | 9013 | 9133 | 9184 |
| 1 | 3  | 8    | 14   | 17   | 20   | 29   | 32   | 5000 | 5985 | 7189 | 7906 |
| 1 | 9  | 4612 | 5523 | 6456 | 7879 | 8487 | 8952 | 9081 | 9129 | 9164 | 9214 |
| 1 | 5  | 23   | 26   | 33   | 35   | 7135 | 8525 | 8983 | 9015 | 9048 | 9154 |
| 2 | 3  | 30   | 3652 | 4067 | 5123 | 7808 | 7838 | 8231 | 8474 | 8791 | 9162 |
| 2 | 35 | 3774 | 4310 | 6827 | 6917 | 8264 | 8416 | 8542 | 8834 | 9044 | 9089 |
| 2 | 15 | 631  | 1077 | 6256 | 7859 | 8069 | 8160 | 8657 | 8958 | 9094 | 9116 |

Secondly, setting up a first cycle with cycle index I, the I ranging from 1 to 9, using the data of Ith row in the above table to form a sequence and denoting as hexp; nesting a second cycle with cycle index J within the first cycle in which J is ranged from 1 to 256, obtaining the row variable "row" of the $\frac{3}{4}$ LDPC code check matrix using the formula row=[(J−1)*9+I]; nesting a third cycle with a cycle index K under the row variable "row" in the second cycle with the K ranging from 1 to 12, the Kth data of the data sequence hexp being denoted as hexp(K), and obtaining the $\frac{3}{4}$ LDPC code check matrix according to the following formula:

column=Mod [($\lfloor h\mathrm{exp}(K)/36 \rfloor$+J−1),256]×36+Mod [$h\mathrm{exp}(K)$,36]+1.

40. The digital information transmission method according to claim 10, wherein the bit interleaver uses a 384×360 block interleaver, the bit data outputted from the LDPC encoder is written into each row of the block interleaver in turn in the order from up to low until the whole block interleaver is filled up, then it is read column by column from left to right in turn, and the output of the bit interleaver is aligned with the time slot.

41. The digital information transmission method according to claim 10, wherein the constellation mapping includes one of BPSK, QPSK, 16QAM.

42. The digital information transmission method according to claim 10, wherein, in the frequency-domain generating step, the 384 discrete pilots, 82 continuous pilots and 2610 data sub-carriers are multiplexed together in each OFDM symbol to form 3076 effective sub-carriers.

43. The digital information transmission method according to claim 42, wherein the 82 continuous pilots use the 0th, 22th, 78th, 92th, 168th, 174th, 244th, 274th, 278th, 344th, 382th, 424th, 426th, 496th, 500th, 564th, 608th, 650th, 688th, 712th, 740th, 772th, 846th, 848th, 932th, 942th, 950th, 980th, 1012th, 1066th, 1126th, 1158th, 1214th, 1244th, 1276th, 1280th, 1326th, 1378th, 1408th, 1508th, 1537th, 1538th, 1566th, 1666th, 1736th, 1748th, 1794th, 1798th, 1830th, 1860th, 1916th, 1948th, 2008th, 2062th, 2094th, 2124th, 2132th, 2142th, 2226th, 2228th, 2302th, 2334th, 2362th, 2386th, 2424th, 2466th, 2510th, 2574th, 2578th, 2648th, 2650th, 2692th, 2730th, 2796th, 2800th, 2830th, 2900th, 2906th, 2982th, 2996th, 3052th, 3075th sub-carriers in the 3076 effective sub-carriers, and the 22th, 78th, 92th, 168th, 174th, 244th, 274th, 278th, 344th, 382th, 424th, 426th, 496th, 500th, 564th, 608th, 650th, 688th, 712th, 740th, 772th, 846th, 848th, 932th, 942th, 950th, 980th, 1012th, 1066th, 1126th, 1158th, 1214th, 1860th, 1916th, 1948th, 2008th, 2062th, 2094th, 2124th, 2132th, 2142th, 2226th, 2228th, 2302th, 2334th, 2362th, 2386th, 2424th, 2466th, 2510th, 2574th, 2578th, 2648th, 2650th, 2692th, 2730th, 2796th, 2800th, 2830th, 2900th, 2906th, 2982th, 2996th, 3052th sub-carriers, 64 in total, carry 16 bit system information, the system information comprises 6 bits of time slot number, 1 bit of synchronous identification of the byte interleaver, 1 bit of control logical channel modify indication and 8 bits being reserved; the continuous pilots are mapped onto the sub-carriers in a form of $0 \rightarrow \sqrt{2}/2 + \sqrt{2}/2j$, $1 \rightarrow -\sqrt{2}/2 - \sqrt{2}/2j$, and the symbols on the same continuous sub-carrier points of the different OFDM symbols in the same time slot are identical.

44. The digital information transmission method according to claim 42, wherein the sub-carrier number m corresponding to the discrete pilot in the OFDM symbol is as follows when the number of the OFDM symbol in each time slot is n:

$$\text{if } \mathrm{mod}(n, 2) == 0 \ m = \begin{cases} 8p+1, & p=0,1,2,\ldots,191 \\ 8p+3, & p=192,193,194,\ldots,383 \end{cases}$$

-continued $$\text{if } \mathrm{mod}(n, 2) == 1 \ m = \begin{cases} 8p+5, & p=0,1,2,\ldots,191 \\ 8p+7, & p=192,193,194,\ldots,383 \end{cases},$$

the discrete pilots are all set to 1+0j.

45. The digital information transmission method according to claim 10, wherein the generating polynomial of the pseudo-random sequence in the scrambling step is $x12+x11+x8+x6+1$; and there are 8 scrambling modes, and the initial values of the corresponding registers are as follows respectively:
   1) scrambling mode 0: initial value 0000 0000 0001
   2) scrambling mode 1: initial value 0000 1001 0011
   3) scrambling mode 2: initial value 0000 0100 1100
   4) scrambling mode 3: initial value 0010 1011 0011
   5) scrambling mode 4: initial value 0111 0100 0100
   6) scrambling mode 5: initial value 0100 0100 1100
   7) scrambling mode 6: initial value 0001 0110 1101
   8) scrambling mode 7: initial value 1010 1011 0011
   the pseudo-random sequence is reset at the front end of each time slot, all time slots are scrambled by the same pattern.

46. The digital information transmission method according to claim 10, wherein the IFFT transforming step is as follows:
   4096-point IFFT transformation is performed after the 3076 effective sub-carriers are put on the first~$1538^{th}$ and $2558^{th}$~$4095^{th}$ sub-carriers of the 4096 sub-carriers.

47. The digital information transmission method according to claim 10, wherein the time-domain framing step is as follows:
   the modulated OFDM symbol is added with guard intervals, synchronous signal, transmitter identification signal in turn to form a time slot, and then 40 time slots are concatenated to form a physical signal frame.

* * * * *